United States Patent
Stafford et al.

(10) Patent No.: US 10,395,428 B2
(45) Date of Patent: Aug. 27, 2019

(54) HMD TRANSITIONS FOR FOCUSING ON SPECIFIC CONTENT IN VIRTUAL-REALITY ENVIRONMENTS

(71) Applicant: Sony Interactive Entertainment Inc., Tokyo (JP)

(72) Inventors: Jeffrey Roger Stafford, Redwood City, CA (US); Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/619,395

(22) Filed: Jun. 9, 2017

(65) Prior Publication Data
US 2017/0358141 A1 Dec. 14, 2017

Related U.S. Application Data

(60) Provisional application No. 62/349,652, filed on Jun. 13, 2016.

(51) Int. Cl.
*G06F 3/01* (2006.01)
*G06F 3/0482* (2013.01)
(Continued)

(52) U.S. Cl.
CPC .......... *G06T 19/006* (2013.01); *A63F 13/537* (2014.09); *G02B 27/017* (2013.01);
(Continued)

(58) Field of Classification Search
CPC .......... G02B 2027/0138; G02B 27/017; G06F 2203/04806; G06F 3/013; G06F 3/04842; G06T 19/006; G06T 7/246
See application file for complete search history.

(56) References Cited

U.S. PATENT DOCUMENTS 9,170,425 B1 * 10/2015 Harrison ................ G02B 17/06
9,197,864 B1 11/2015 Starner et al.
(Continued)

OTHER PUBLICATIONS

PCT/US2017/037078, Partial International Search, ISA/206, dated Aug. 22, 2017, 10 pages.

*Primary Examiner* — Sing-Wai Wu
(74) *Attorney, Agent, or Firm* — Penilla IP, APC

(57) ABSTRACT

Methods and systems for presenting an object on to a screen of a head mounted display (HMD) include receiving an image of a real-world environment in proximity of a user wearing the HMD. The image is received from one or more forward facing cameras of the HMD and processed for rendering on a screen of the HMD by a processor within the HMD. A gaze direction of the user wearing the HMD, is detected using one or more gaze detecting cameras of the HMD that are directed toward one or each eye of the user. Images captured by the forward facing cameras are analyzed to identify an object captured in the real-world environment that is in line with the gaze direction of the user, wherein the image of the object is rendered at a first virtual distance that causes the object to appear out-of-focus when presented to the user. A signal is generated to adjust a zoom factor for lens of the one or more forward facing cameras so as to cause the object to be brought into focus. The adjustment of the zoom factor causes the image of the object to be presented on the screen of the HMD at a second virtual distance that allows the object to be discernible by the user.

14 Claims, 12 Drawing Sheets

(51) Int. Cl.
    *G06T 11/60*     (2006.01)
    *G06T 19/00*     (2011.01)
    *G06T 7/246*     (2017.01)
    *H04N 5/232*     (2006.01)
    *A63F 13/537*     (2014.01)
    *G06T 17/05*     (2011.01)
    *G02B 27/01*     (2006.01)
    *G06F 3/0484*     (2013.01)

(52) U.S. Cl.
    CPC .............. *G06F 3/011* (2013.01); *G06F 3/013* (2013.01); *G06F 3/0482* (2013.01); *G06F 3/04842* (2013.01); *G06T 7/246* (2017.01); *G06T 11/60* (2013.01); *G06T 17/05* (2013.01); *H04N 5/23296* (2013.01); *A63F 2300/6081* (2013.01); *A63F 2300/66* (2013.01); *A63F 2300/8082* (2013.01); *G02B 2027/014* (2013.01); *G02B 2027/0118* (2013.01); *G02B 2027/0127* (2013.01); *G02B 2027/0138* (2013.01); *G02B 2027/0178* (2013.01); *G02B 2027/0187* (2013.01); *G06F 2203/04806* (2013.01)

(56) References Cited

U.S. PATENT DOCUMENTS

| | | | |
|---|---|---|---|
| 2004/0189597 A1* | 9/2004 | Amitani | H04M 1/0214 345/156 |
| 2013/0050258 A1 | 2/2013 | Liu et al. | |
| 2014/0266988 A1 | 9/2014 | Fisher et al. | |
| 2014/0351896 A1* | 11/2014 | Koo | G06F 21/62 726/4 |
| 2015/0220157 A1 | 8/2015 | Marggraff et al. | |
| 2016/0077620 A1* | 3/2016 | Choi | G06F 3/0488 345/173 |
| 2016/0124514 A1* | 5/2016 | Cha | G06F 3/017 715/767 |
| 2017/0024604 A1* | 1/2017 | Cho | G06K 9/0061 |

* cited by examiner

Communication architecture of a head mounted display

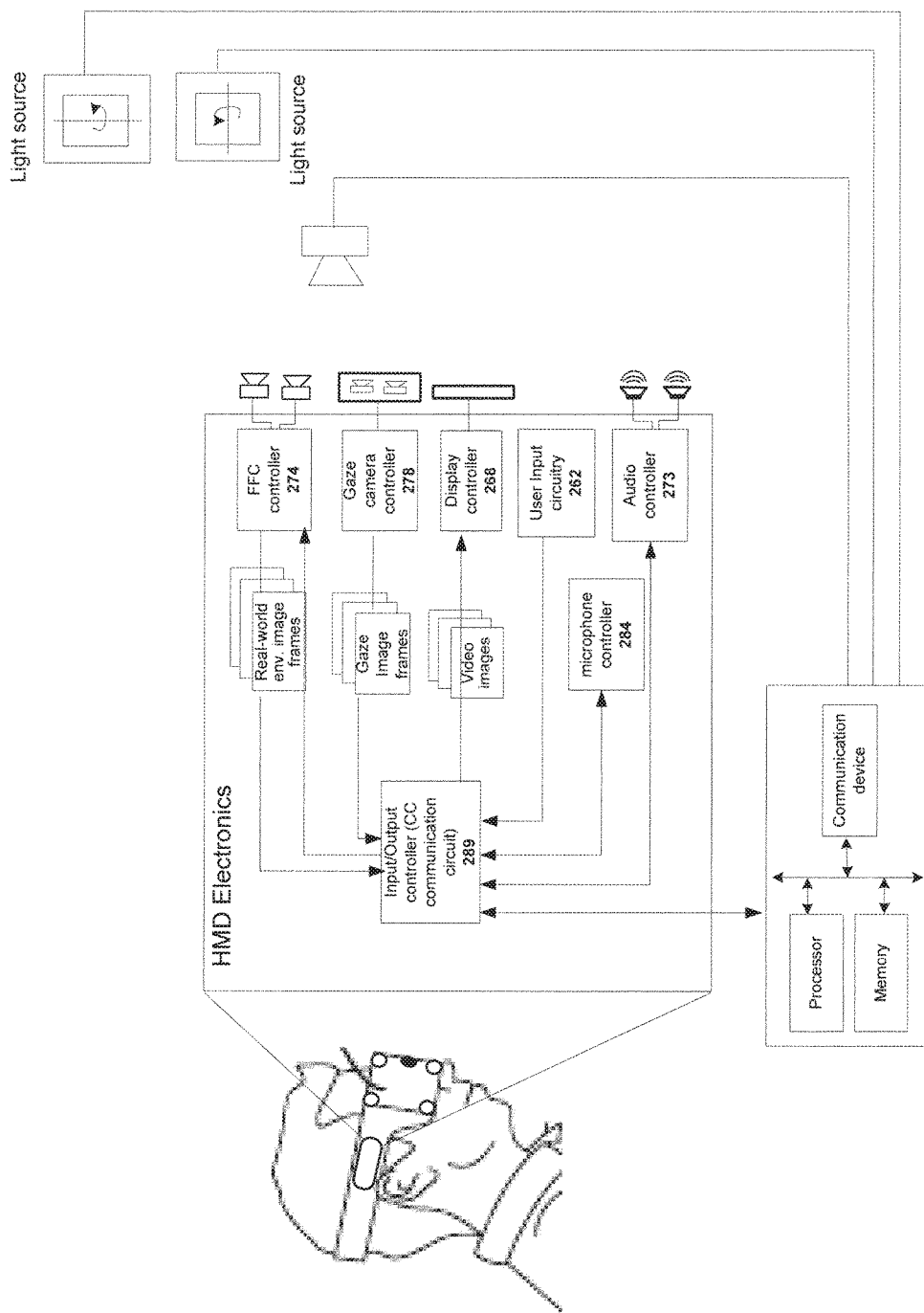

HMD TRANSITIONS FOR FOCUSING ON SPECIFIC CONTENT IN VIRTUAL-REALITY ENVIRONMENTS

CLAIM OF PRIORITY

This application claims priority under 35 U.S.C. § 119 to U.S. Provisional Patent Application No. 62/349,652, filed on Jun. 13, 2016, and entitled "Methods and System for Rendering Objects in Augmented Reality", the disclosure of which is incorporated herein by reference in its entirety.

FIELD

The present disclosure relates to systems and methods for presenting objects using augmented reality, on a head mounted display.

BACKGROUND

Description of the Related Art

Computing and video gaming industry have seen many changes over the years. As computing power has expanded, developers of various interactive applications, such as video game applications, have created application software that takes advantage of these increases in computing power. To this end, application developers, such as video game developers, have been developing games that incorporate sophisticated operations to increase interaction between a user and the gaming system so as to produce a very realistic game play experience.

Generally speaking, gesture input refers to having an electronic device, such as a computing system, video game console, smart appliance, etc., react to some gesture made by the player and captured by the electronic device. One way of accomplishing a richer interactive experience is to use wireless game controllers to provide gesture input. Movement of the wireless game controllers are tracked by the gaming system in order to track a player's movements and to determine gesture input provided by the player, and use these movements and gesture inputs as inputs for affecting the state of the game.

Another way of accomplishing a more immersive interactive experience is to use a head-mounted display. A head-mounted display (HMD) is worn by the player and can be configured to present various graphics, such as a view of a virtual scene, on a display screen of the HMD. The graphics presented on the screen of the head-mounted display can cover a large portion or even all of a player's field of view. The head-mounted display can provide a visually immersive experience to the player by blocking the view of the real-world scene.

To further enhance the immersive experience for a player at any given time, the HMD may be configured to just render game scene of a virtual game generated by a computer/computing device, for example, or live images from a real-world environment, or a combination of both the real-world environment and virtual game scene. However, all the objects or details provided in the images of the real-world environment that are rendered at the display screen of the HMD may not be completely discernible by the player.

It is within this context that embodiments of the invention arise.

SUMMARY OF THE INVENTION

Embodiments of the present invention disclose methods, systems and computer readable media that are used for presenting an object from a real-world environment by bringing the object into focus on a screen of a head mounted display (HMD) for a user to view. In some implementations, the HMD is configured to receive images from a real-world environment or a virtual reality (VR) scene and render the images on a screen of the HMD. While rendering the images, information provided by one or more sensors in the HMD is used to detect a gaze direction of a user wearing the HMD. In response to detecting the gaze direction, an object from the images of the real-world environment that is in line with the gaze direction of the user is identified, and a signal is generated to adjust a zoom factor for the lens of the one or more forward facing cameras disposed on the HMD. The zoom factor adjustment causes an image of the real-world environment that includes the object to be brought into focus when rendered on the screen of the HMD. In some implementations, the HMD may take into consideration vision characteristics of the user's eyes when determining the zoom factor for the lens of the HMD. In some implementations, the sensors determine if the user has been gazing at the object for at least a pre-defined threshold period before generating the signal for adjusting the zoom factor for the lens of the HMD. In some implementations, the signal that includes instructions to adjust zoom factor of the image may include information to adjust optical setting of the lens so as to allow optical zooming of the image of the object. In other implementations, the signal that includes instructions to adjust zoom factor may include instruction to perform digital zooming of the image. Thus, depending on the type of images that are being rendered, the zoom factor may include instructions or information to allow either optical zooming or digital zooming.

The implementations provide ways to present augmented reality of a real-world environment by allowing specific points or specific ones of objects captured in the images of the real-world environment to be manipulated and presented to the user so that the user can discern the specific points or objects clearly. The embodiments may be extended to present an enhanced view of a VR scene rendered on a screen of the HMD by bringing a specific object of the VR scene into focus. In some embodiments, a signal that is generated may take the vision characteristics of the user's eyes into consideration when adjusting the zoom factor. Augmenting the real-world environment or enhancing the VR scene allows the user wearing the HMD to be able to discern the various objects or portions of a scene that is being rendered on the screen of the HMD to have a satisfying immersive experience.

Images from the VR scene are usually pre-recorded images/videos. In some embodiments, when images from a VR scene are being rendered at the HMD, historic input from other users that have viewed the images of the VR scene may be considered when generating the signal to adjust the zoom factor. For example, in some embodiments, the historic inputs from other users may be correlated with content from the VR scene to determine specific zoom factor settings that caused other users to experience dizziness, motion sickness, etc. This information may be used to refine the zoom factor adjustment for the lens of the one or more forward facing cameras when rendering such content, so that the user does not experience motion sickness, dizziness, etc., when images from the VR scene are presented to the user wearing the HMD. In some embodiments, options may be provided to the users (e.g., thrill seekers) to override such refinement in order to be able to view the content with specific zoom factor settings.

The embodiments of the invention enable the HMD to act as virtual binoculars by allowing the HMD to present specific portions of images of the VR scene or the real-world environment to be zoomed in by adjusting the zoom factor of the lens of the image capturing devices. Inputs from the various controllers and sensors of the HMD can be used to dynamically activate or deactivate specific settings of the lens of the one or more forward facing cameras to allow the user to view the content with sufficient clarity. In alternate implementations, specific features or portions of an image may be adjusted to allow an object that includes the specific features or in the portions is to be brought into focus. In some implementations, the HMD acts to virtually teleport a user from one location within the VR scene or the real-world environment to another, and such teleporting is done to enhance the user's experience of the VR scene or augmented reality (AR) world. For example, a specific area or a portion of the VR scene may be brought into focus to make it appear that the user is teleported to a location proximal to the specific area or portion.

In one embodiment, a method for presenting an object from a real-world environment on to a screen of a head mounted display (HMD), is provided. The method includes receiving an image of a real-world environment in proximity of a user wearing the HMD. The image is received from one or more forward facing cameras of the HMD and processed for rendering on a screen of the HMD by a processor within the HMD. A gaze direction of the user wearing the HMD, is detected using one or more gaze detecting cameras of the HMD that are directed toward one or each eye of the user. Images captured by the forward facing cameras are analyzed to identify an object captured in the real-world environment that correlates with the gaze direction of the user. The image of the object is rendered at a first virtual distance that causes the object to appear out-of-focus when presented to the user. A signal is generated to adjust a zoom factor for lens of the one or more forward facing cameras so as to cause the object to be brought into focus. The adjustment of the zoom factor causes the image of the object to be presented on the screen of the HMD at a second virtual distance that allows the object to be discernible by the user.

In some implementations, the signal is generated after determining the user's gaze direction is directed toward the object for a pre-defined length of time.

In some implementations, the object is brought into focus for a pre-defined period of time. Upon expiration of the pre-defined period of time, images from the real-world environment are rendered.

In some implementations, the zoom factor is adjusted to account for vision characteristics of the user's eyes wearing the HMD.

In some implementations, the signal to adjust the zoom factor includes a signal to adjust an aperture setting of lens in the one or more forward facing cameras so as to cause an adjustment to a depth at which the image of the object is captured by the one or more forward facing cameras of the HMD.

In some implementations, the signal to adjust the zoom factor includes a signal to adjust a focal length of lens of the one or more forward facing cameras when capturing the images of the object in the real-world environment. The adjustment to the focal length of the lens causes a zooming in on the object.

In some implementations, the signal to adjust the zoom factor includes a signal to control a speed of zooming, wherein the speed of zooming is controlled based on type of the images of the real-world environment captured or based on the user.

In some implementations, the signal to adjust the zoom factor further includes a signal to adjust brightness level of the screen of the HMD.

In some implementations, a three-dimensional digital model of the real-world environment is constructed using the image captured by the forward facing cameras of the HMD. The three-dimensional digital model is constructed by tracking different points captured in multiple frames of the images using more than one camera and correlating the different points captured by the cameras to a three-dimensional space.

In some implementations, identifying the object includes outlining the object captured in the images that correspond with the gaze direction and receiving confirmation of the object from the user wearing the HMD.

In some implementations, a method for rendering an object on a screen of a head mounted display (HMD), is disclosed. The method includes receiving images from a virtual reality (VR) scene for rendering on the screen of the HMD. Selection of an object from the images of the VR scene rendered on the screen of the HMD, is detected. The selected object is determined to be rendered at a first virtual distance that makes the object appear to be out of focus for a user wearing the HMD. An area in the VR scene that is proximal to the object, is identified. The identified area defines a freedom of movement for the user in relation to the object when viewing the object. A signal is generated to virtually teleport the user to the area proximal to the selected object. The virtual teleportation of the user causes the object to be presented on the screen of the HMD at a second virtual distance that allows the object to be discernible by the user.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 3 illustrates example architecture of a system that is used to adjust an image of an object from a real world environment to be discernible to a user wearing the HMD, in accordance to an embodiment of the present invention.

DETAILED DESCRIPTION

Figure 1:
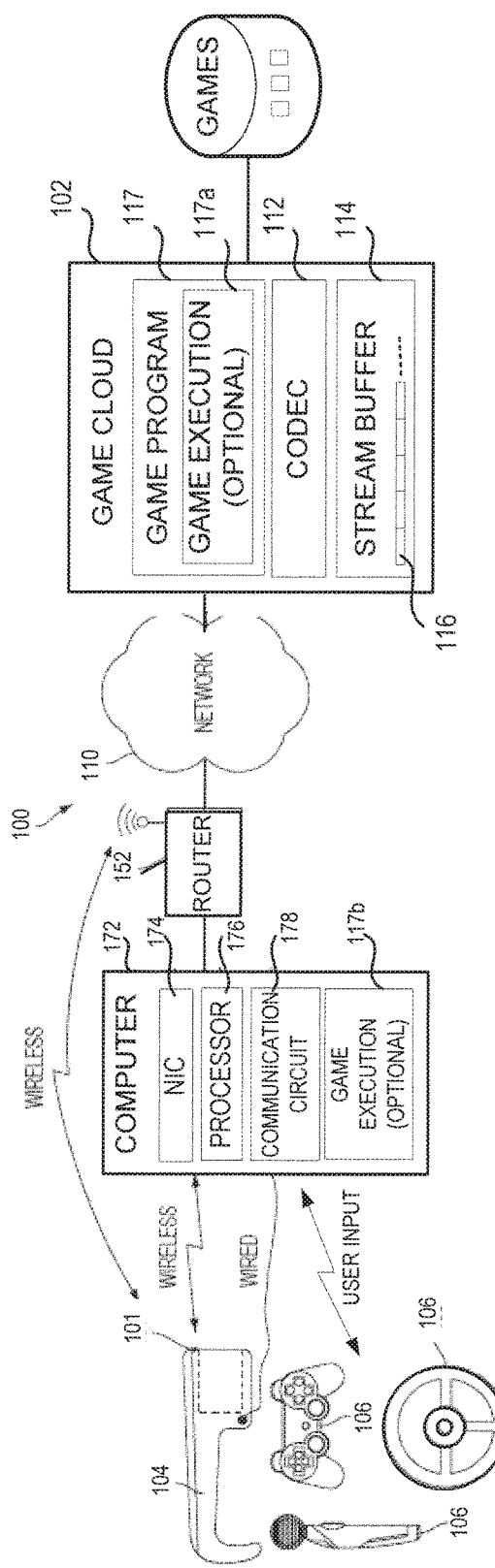
FIG. 1 illustrates a simplified block diagram of a communication architecture of a head mounted display that is used in bringing an object captured from a real world or virtual world into focus, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various implementations, a user wearing a head mounted display (HMD) may be presented with images of a real-world environment or a virtual reality (VR) scene on a screen of the HMD. The image of the real-world environment may be captured by one or more forward facing cameras of the HMD. Alternately, image from the VR scene may be part of a video game or may be a pre-recorded video that is transmitted from a computing device that is communicatively connected to the HMD. The various components (e.g., sensors, cameras, etc.,) in the HMD are used to detect a gaze direction of a user wearing the HMD. The gaze direction of the user is used to identify an object within the images that is of interest to the user or has captured the attention of the user. Upon detecting the user's continued interest in the object, a signal is generated by the processor of the HMD to adjust optical elements of the HMD to perform an optical zoom or to adjust images via a digital zoom so that the object that is of interest to the user or has captured the attention of the user is brought into focus.

In some implementations, the HMD acts as a virtual teleporter by adjusting how the images are rendered on the screen so as to make it appear that the user wearing the HMD has been dynamically teleported to an area closer to an object or area or a scene that has captured the interest of the user. The speed of teleporting or transitioning of the user may depend on the type of content that is being rendered and can also be adjusted to ensure that such transition does not cause any distress to the user. Once the user has been virtually transitioned to the area closer to the object or scene, the user may provide input using a controller or through gestures, and such input provided in the physical or virtual world is interpreted and used to adjust content that is being rendered on the screen of the HMD. In some implementations, the area closer to the object is correlated with a physical environment in which the user operates his HMD. In such embodiments, a boundary of the area closer to the object to which the user has been teleported is correlated with the confines of the user's physical world environment.

As the user interacts with the images rendered on the HMD, such interactions are interpreted in relation to the real-world environment by the HMD system and appropriate feedback is provided to the user. For example, if the teleporting causes the user to be at the edge of a scene (e.g., edge of a virtual cliff, a virtual building, a physical wall, a real world obstacle, etc.) or be in a situation that can potentially harm the user or cause the user to feel disoriented, etc., the feedback may provide appropriate warning. The feedback may be provided in visual format, audio format, haptic format, textual format, optical format, or any combinations thereof.

With the general understanding of the invention, specific embodiments will be described with reference to the various drawings. It should be noted that various embodiments described in the present disclosure may be practiced without some or all of the specific details described herein. In other instances, well known process operations have not been described in detail in order not to unnecessarily obscure various embodiments described in the present disclosure.

FIG. 1 is an embodiment of an exemplary configuration of a system 100 used to implement the various embodiments. The system includes a head mounted display (HMD) 104 that is worn on a head of a user, and a computer 172. In some implementations, the system may also include a hand-held controller (HHC) 106 to allow the user to interact with content provided for rendering on a display screen of the HMD 104 and generate user input. In various implementations, the computer 172 may be a general purpose computer, a special purpose computer, a gaming console, a mobile phone, a tablet device, or other such device, which is configured to execute one or more portions of an interactive application, such as a video game, that provides content for rendering on the display screen of the HMD 104. The interactive application may be a multi-user game application 117 that is played by multiple users or may be a single user game application played by the user. In some embodiments, at least a portion 117b of the game application is executing on the computer. In such embodiments, any remaining portions 117a of the interactive game application may be executed on a cloud system, such as a game cloud system 102, e.g., on one or more virtual machines (VMs), wherein the game content and user interactions are exchanged through a network 110, such as the Internet. In some embodiments, the computer 172 may be part of the game cloud system 102 and the HMD and the hand-held controller (HHC) directly communicate with the computer disposed on the game cloud system 102 via the network 110. In such embodiments, a portion of the interactive application is executed by the computer on the game cloud system and the remaining portion of the interactive application is executed on the HMD 104.

The HMD 104 is a device, worn directly on a head of a user or as part of a helmet. The HMD 104 has a small display optic, e.g., lens, glass, waveguide, etc., in front of one or each eye of the user. In some embodiments, a scene, e.g., virtual scene, augmented virtual reality scene, augmented real world environment, etc., is displayed on a display screen of the HMD and is viewed through the display optics provided in front of one or each eye of the user. In instances where the display optics are in front of each eye of the user, both eyes see one scene.

In some embodiments, the HMD 104 is capable of receiving and rendering video output from an application executing on the computer and/or on the cloud system, such as a game cloud system. In various embodiments, the HHC and/or the HMD communicates wirelessly with the computer, as this provides for greater freedom of movement of the HHC and/or the HMD than a wired connection. In an alternate embodiment, the HHC and/or the HMD communicate with the computer through a wired connection.

The HHC 106 may include any of various features, such as buttons, inertial sensors, trackable LED lights, touch screen, a joystick with input controls, directional pad, trigger, touchpad, touchscreen, and may have circuitry/logic to detect and interpret hand gestures, voice input or other types of input mechanisms for providing input to the interactive application. Furthermore, the HHC may be a motion controller that enables the user to interface with and provide input to the interactive program by moving the controller.

Along similar lines, the HMD 104 may include a user input circuit that enables the user to interface with and provide input to the interactive application by moving the HMD. Various technologies may be employed to detect the position and movement of a the HMD and/or motion controller that is communicatively coupled to the HMD. For example, the motion controller and/or the user input circuit of the HMD may include various types of inertial sensor circuits, such as accelerometers, gyroscopes, and magnetometers. In some embodiments, the motion controller may include global position systems (GPS), compass, etc. In some embodiments, an accelerometer is a 6-axis low latency accelerometer. In some embodiments, the motion controller and/or the user input circuit can include one or more fixed reference objects (otherwise termed "marker elements"), e.g., light emitting diodes (LEDs), colored points, light reflectors, etc., that can be tracked using image capturing devices. For example, the images of the fixed reference objects are captured by one or more digital cameras (not shown) of the system that are disposed to face a user wearing the HMD and to track the position of the user, the HMD and/or the HHC. Gesture actions and movement of the user, the HMD and/or the HHC are also captured by the digital cameras. In some embodiments, a digital camera includes a video camera that further includes a single Charge Coupled Device (CCD), an LED indicator, and hardware-based real-time data compression and encoding apparatus so that compressed video data may be transmitted in an appropriate format, such as an intra-image based motion picture expert group (MPEG) standard format. The position and movement of the user, the motion controller and/or the HMD can be determined through analysis of the images captured by the one or more digital cameras.

In one embodiment, the HMD 104 includes a router 152 to communicate with the internet 110. In an alternate embodiment, the HMD 104 may communicate with the cloud system over the Internet 110 using a router 152 that is external to the HMD 104. In some embodiments, the game cloud 102 is referred to herein as a game cloud system. The HMD 104 is placed by a user on his head in a manner that is similar to the user putting on a helmet, so that lenses of the HMD 104 are located in front of one or both eyes of the user. In some embodiments, the HMD 104 is worn like glasses, (e.g., prescription glasses, goggles, etc.). The HHC 106 is held by the user 106 in his/her hands.

In various embodiments, instead of the HHC 106, hands of the user 108 may be used to provide gestures, e.g., hand gestures, finger gestures, etc., that may be interpreted by interactive application and/or the logic within the HMD 104. In some embodiments, the user may wear an interactive glove with sensors to provide tactile feedback. The interactive glove acts as the HHC, when worn by a user, and provides input in the form of interactive gestures/actions to the interactive program and/or the HMD. Similar to the HHC, the interactive glove may include marker elements, such as LEDs, light reflectors, etc., to allow detection of various movements. The interactive glove is one form of wearable device that is used to provide input to the HMD and/or the interactive program and that other forms of wearable clothing/device may also be engaged. A digital camera 101 of the HMD 104 captures images of the gestures provided by a user and a processor within the HMD 104 analyzes the gestures to determine whether a game displayed within the HMD 104 is affected by the gestures.

In one embodiment, the digital camera 101 is located on a face plate of the HMD 104 facing forward to capture real-world images including gestures provided by the user. In some embodiments, more than one digital cameras may be provided on the face plate of the HMD 104 to capture different angles of the real-world images. In some embodiments, the digital camera may be a stereo camera, an IR camera, a single-lens camera, etc. As used herein, the processor of the HMD may be a microprocessor, a programmable logic device, an application specific integrated circuit (ASIC), or a combination thereof.

The system 100 includes a network 110, which may be a local area network (LAN), a wide area network (WAN), or a combination thereof. Examples of the network 110 include the Internet, an Intranet, or a combination thereof. In some embodiments, the network 110 uses a transmission control protocol (TCP)/Internet Protocol (IP) or a user datagram protocol/IP (UDP/IP) to communicate media data via the network 110 between the game cloud 102 and the HMD 104 or the HHC 106. The embodiments are not restricted to the TCP/IP or UDP/IP protocol but can also engage other forms of communication protocols (including any proprietary or non-proprietary protocols) for communicating media data via the network. In various embodiments, the network uses a combination of Ethernet and TCP/IP protocol to communicate media data via the network 110 between the game cloud 102 and the HMD 104 or the HHC 106.

The game cloud 102 includes a coder/decoder (codec) 112 and a stream buffer 114. The stream buffer 114 stores a stream of media data 116, which is generated upon execution of a game program 117. The media data 116 includes virtual environment data, virtual game object data, a combination thereof, etc. The virtual environment data is used to generate a virtual environment of a game and the virtual game object data is used to generate one or more virtual game objects, e.g., virtual game characters, virtual game objects, virtual points, virtual prizes, game interface, etc. Examples of a virtual environment include a virtual geographic region, e.g., a virtual city, a virtual road, a virtual lake, a virtual ocean, etc. The game program 117 is an example of the interactive application executed by one or more servers of the game cloud 102. The codec 112 uses a compressor/decompressor to code/decode media data using lossy compression, lossless compression, etc.

The HMD 104 is used to access an operating system (OS) that is executed by the processor of the HMD 104. For example, selection and activation of a button in the HMD 104 enables the processor of the HMD 104 to execute the OS. Similarly, the HHC 106 may be used to access an OS that is executed by the processor of the HHC 106. A button on the HHC 106 may be used to have the processor of the HHC 106 to execute the OS.

In some embodiments, the OS allows the HMD 104 to directly access the network 110. For example, a user may select a network access application that is executed by the processor of the HMD 104 on top of the OS, using a network access icon, a network access symbol, etc. The network access application provides a list of networks from which to select a network for accessing the network 110. User authentication may be required to access the network 110, in accordance to network access protocol. Access to the network 110 is enabled for the user upon selection and successful user authentication (if needed). A built-in router (not shown) within the HMD 104 uses the network 110 to interact with the game cloud to exchange game data. In these embodiments, the communication between the network 110 and the HMD 104 follows a wireless communication protocol. Along similar lines, the HHC 106 gains access to the network 110 by selecting the network using network access application and the communication between the HHC 106 and the network follows a wireless communication protocol.

Once the network 110 is accessed, the OS allows the HMD 104 to access the game program 117 in a manner similar to the selection of the network. For example, when the user selects a game access application executed by the processor of the HMD 104 on top of the OS through a game access icon, a game access symbol, etc., the game access application requests access to the game program 117 via the network and the processor of the HMD 104 for displaying to the user.

Upon obtaining access to the game program 117, a microcontroller of the HMD 104 displays game scenes of the game on a display screen of the HMD 104. In some embodiments, the display screen of the HMD 104 is a high performance miniature screen to reduce blur when the HMD 104 is moved rapidly. In one embodiment, the display screen is a Liquid Crystal Display (LCD) screen, liquid crystal on silicon (LCoS), or organic light emitting diodes (OLEDs), or cathode ray tubes, etc. Images are projected by the lens of the display optics of the HMD onto the display screens. Adjustment may be made to the lens of the display optics or the display screens and such adjustments affect the images that are rendered on the display screens of the HMD. The user performs one or more head and/or eye motions, e.g., head tilting, winking, gazing, shifting gaze, staring, etc., and each head or eye motion triggers the user input circuit to generate an input, which may be used to play the game. In these embodiments, the game program 117 executes on the game cloud 102 and the communication between the game program 117 and the HMD 104 is through the built-in router and the network 110. The images rendered on the display screen of the HMD 104 are viewed through the display optics, which provides near-eye focus.

In some embodiments, the game access application requests user authentication information, such as a username and/or a password, from the user to access the game program 117. Upon receiving successful authentication from the game cloud 102, the game access application allows access of the game program 117 to the user.

In various embodiments, instead of accessing the game application/program, the user requests access to a web page upon accessing the network 110 and the web page allows the user to access the game program 117. For example, the user selects a web browser application via the user input circuit or via the HHC 106 to access a web page. Upon accessing the web page, the user plays a game displayed on the web page or accesses the game using a link provided within. The game is rendered when the game program 117 is executed on the game cloud 102. In some embodiments, user authentication may be required before providing access to the web page to play the game that is displayed when the game program 117 is executed on the game cloud 102. The username and/or the password is authenticated in a manner similar to that described above when the user accesses a game via the game access application.

When the game program 117 is accessed, the codec 112 encodes, e.g., compresses, etc., a digital data stream of the media data 116 for sending a stream of encoded media data to the HMD 104 via the network 110. In some embodiments, a digital data stream of the encoded media data is in the form of packets for sending via the network 110.

The HMD 104 receives the digital data stream of the encoded media data for the selected game program via the network 110 from the codec 112 and the digital data stream is processed, e.g., de-packetized, decoded, etc., and the processed stream is used to display game scene on the display screen of the HMD 104. As a game scene is being displayed on the display screen of the HMD 104, an external camera 101 of the HMD 104 captures one or more images of a real-world environment in the immediate vicinity of the user, from a user's perspective. In some embodiments, the external camera 101 is a video camera. Examples of the real-world environment include a room from where the user is accessing the game, a geographical region in which the user is located, real-world objects around the user, etc. Examples of a geographical region include a park, a road, a street, a lake, a city, a landmark, etc. Examples of a real-world object include a bus stand, a coffee shop, a store, an office, a vehicle, a room, a desk, a table, a chair, a ball, etc. Real-world environment data, including one or more images of the real-world environment, in one embodiment, is processed and stored locally in the HMD and used for subsequent rendering on the screen of the HMD. User input may be processed, packetized and encoded by the HMD 104, and sent to the codec 112 in the game cloud 102 through the built-in router and the network 110. In some embodiments, in addition to the user input, the real-world environment data may also be packetized and encoded by the HMD 104 and sent as a stream of encoded environment data via the built-in router of the HMD 104, the network 110 to the codec 112 in the game cloud 102.

User inputs may be provided through the HMD 104 and/or the HHC 106. For example, the user may provide input using input interface/mechanism provided in the HMD 104. Alternately, the user may perform hand motions, e.g., press of a button, movement of a joystick, hand gesture, finger gesture, a combination thereof, etc., using the HHC and such user input provided at the HHC 106 generates input data that is converted into input signals by a communications circuit of the HHC 106 for sending to a communications circuit of the HMD 104. Of course, the HHC includes hand-held controllers, joysticks, motion controllers, wearable articles of clothing, wearable devices, etc. The input signals originating from the HHC 106 and the HMD 104 are converted from an analog form to a digital form by the communications circuit of the HMD 104, packetized, encoded by the HMD 104 and sent via the network 110 to the codec 112. Examples of a communications circuit of the HMD include a transceiver, a transmit/receive circuitry, a network interface controller, etc.

In some embodiments, the game program 117 maps input data that is generated by the HMD with input data that is generated at the HHC (for e.g., based on the hand motions) to determine whether to change a state of a game that is displayed on the HMD 104. For example, when an input from the HMD is received via the network 110 with an input generated at the HHC 106, such as a press of a button on the HHC 106, the game program 116 determines to change a state of a game. Otherwise, the game program 117 determines not to change a state of a game.

Input data of the inputs generated based on the hand motions and/or hand-held controller motions are communicated by a communications circuit of the HHC 106, e.g., a transceiver, a transmit/receive circuitry, etc., to a communications circuit, e.g., a transceiver, a transmit/receive circuitry, etc., of the HMD 104. Input data communicated to the HMD and/or input data generated by the HMD are packetized and encoded by the HMD 104 and sent as a stream of encoded input data via the network 110 to the codec 112. For example, the input data may be sent directly from the HMD 104 using the built-in router via the network 110 to the game cloud 102. In a number of embodiments, the user performs the hand motions and provides user input from the HMD to change a location and/or orientation of the virtual object rendered at the HMD.

The codec 112 decodes, e.g., decompresses, etc., the stream of encoded input data received via the network 110 from the HMD 104 and the decoded input data is buffered in the stream buffer 114 for de-packetizing and sending to the game program 117. One or more servers of the game cloud 102 de-packetizes the stream of decoded input data and sends the input data to the game program 117. Upon receiving the input data, the game program 117 generates next media data that is packetized by one or more servers of the game cloud 102 to generate a stream of next media data. The additional media data may include modifications to game play, including modifications to virtual game object, e.g., computer-generated object, etc., that is used for updating the virtual game environment rendered on the HMD. The stream of next media data is stored in the stream buffer 114, encoded by the codec 112, and sent as a stream of encoded next media data via the network 110 to the HMD 104. The HMD 104 receives the stream of encoded next media data, de-packetizes the stream, and decodes the encoded next media data to provide the next media data to the microcontroller of the HMD 104. The microcontroller of the HMD 104 changes a display of a game scene rendered on the screen of the HMD based on the next media data. For example, the microcontroller changes a look, position, and/or orientation of the virtual game object that is either overlaid on the one or more images of the real-world environment or simply rendered on the screen of the HMD 104. It should be noted that the input data generated at the HHC and/or the HMD changes a state of the game. In some embodiments, a display of a game scene is referred to herein as a portion of interactivity associated with the game program 117.

In various embodiments, instead of communicating the input data that is generated based on the hand motions from the HHC 106 to the HMD 104, the input data is communicated directly from the HHC 106 via the network 110 to the codec 112. The input data that is generated at the HHC 106 is communicated by the HHC 106 in a manner similar to the communication by the HMD 104. For example, the input data that is generated based on the hand motions from the HHC 106 is encoded and packetized by the HHC 106 and sent as a stream of encoded input data via the network 110 to the codec 112.

It should be noted that in the embodiment illustrated in FIG. 1, the HMD and the HHC individually directly communicate with the network 110 without going through a game console or an external router. In an alternate embodiment, the HHC may communicate with the HMD to transmit the input data generated at the HHC and the HMD may directly communicate the data originating from the HHC and/or the HMD with the network 110. In both of these embodiments, media data 116, additional media data, the next data, etc., are streamlined directly to a wireless access card (WAC) of the HMD 104 by the codec 112 of the game cloud 102 via the network 101 and the built-in router. Moreover, in these embodiments, data, e.g., input data, real-world environment data, etc., is streamed directly by the WAC of the HMD 104 to the codec 112 of the game cloud 102 via the built-in router and the network 110. The WAC in conjunction with the built-in router of the HMD is able to transmit the streaming media data and the input data to and from the HMD.

In some embodiments, a separate router 152 is provided between the HMD 104 and the network 110. The router 152 also acts as an interface between the HHC 106 and the network 110. In this embodiment, the WAC of the HMD 104 will interface with the router 152 to communicate with the network 110. In some embodiments, the HMD 104 is coupled to the router 152 via a wireless connection, e.g., a Bluetooth connection or a Wi-Fi connection, etc. Moreover, the HHC 106 is coupled to the router 152 via a wireless connection. In some embodiments, the router 152 is coupled to the network 110 via a wired connection. When a router is provided, a stream of encoded data is sent from the HMD 104 or the HHC 106 to the router 152. The router 152 routes, e.g., directs, etc., the stream of encoded data to a path in the network 110 to facilitate sending the stream to the codec 112 on the game cloud. The router 152 uses the IP address of the codec 112 to route the stream of encoded data to the codec 112. In some embodiments, the router 152 determines a network path of the network 110 based on network traffic factor, e.g., packet traffic on the network path, congestion on the network path, etc.

The router 152 receives a stream of encoded data from the game cloud 102 via the network 110 and routes the stream of encoded data to the HMD 104. For example, the router 152 routes the stream of encoded data received from the game cloud 102 via the network 110 to the HMD 104 based on the IP address of the HMD 104. In some embodiments that use the systems 100, the game execution occurs mostly on the game cloud 102. In some embodiments, some part of the game may execute on the HMD 104 while the remaining portions may execute on the game cloud 102.

In some embodiments, a list of wireless networks is rendered on the screen of the HMD 104 for user selection. Alternately, in some other embodiments, a list of wireless networks is presented on a display screen associated with the computer 172. For example, when the computer 172 is a mobile phone, the mobile phone includes a display screen for displaying the list of wireless networks. As another example, when the computer 172 is coupled to a television display screen, the list of wireless networks is displayed on the television display screen. In these embodiments, the list of wireless networks is accessed when the processor of the computer 172 executes the wireless access application stored within a memory device of the computer 172 to access the network 110. The processor 176 executes the wireless access application when the user generates input data via the HMD 104 or the HHC 106 by performing the head motions and/or hand motions. Input data generated based on the head motions and/or the hand motions is sent from the communications circuit of the HMD 104 or the HHC 106 to the computer 172. When the processor of the computer 172 receives the input data, the wireless access application is executed to generate the list of wireless networks for user selection to access the network 110.

The computer 172, in some embodiments, includes a network interface controller (NIC) 174 that requests a portion of the game program 117 from the game cloud 102.

Examples of a NIC include a network interface card and a network adapter. The portion of the game program 117 is encoded by the codec 112 and streamed via the network 110 to the NIC 174 of the computer 172. A processor 176 of the computer 172 executes the portion of the game program 117 to generate media data, which is sent from a communications circuit 178, e.g., transceiver, Transmit/Receive circuit, a network interface controller, etc., of the computer 172, to the HMD 104 for display on the display screen of the HMD 104. A communications circuit of the HMD 104 receives the media data from the computer 172 and sends the media data to the microcontroller of the HMD 104 for processing and displaying the media data, including game scene, on the display screen of the HMD 104.

Moreover, the communications circuit 178 of the computer 172 receives input data generated based on the head motions from the HMD 104 and/or the hand motions from the HHC 106 or actions performed at the HMD 104 and sends the input data to the processor 176. The input data, in one embodiment, may be real-world environment data captured by external camera 101 disposed on the outside face of the HMD 104 and transmitted by the communications circuit of the HMD 104. The processor 176 executes the portion of the game program 117b that is stored within the computer 172 to generate additional media data, which is sent from the communications circuit 178 to the communications circuit of the HMD 104. Before or after receiving the additional media data, input data from the HMD 104 and/or the HHC 106 that is generated as part of the game play using head motions and/or the hand motions, is sent by the communications circuit of the HMD 104 to the processor 176 via the communications circuit 178. In response to the input data, the processor 176 executes the portion of the game program 117b that is stored within the computer 172 to generate the next media data, which is sent from the communications circuit 178 to the communications circuit of the HMD 104. The next media data is sent to the communications circuit of the HMD 104 to change the game play, including changing/updating virtual game objects and/or virtual environment of a game displayed by execution of the game program 117. When the game objects, e.g., real world objects, virtual game objects, etc., and/or virtual environment changes, a game state of the game displayed by execution of the game program 117 changes.

In some embodiments, the game state is sent by the NIC 174 of the computer 172 via the router 152 and the network 110 to the game cloud 102 to inform one or more servers of the game cloud of the current game state so as to synchronize the game state of the game on the game cloud 102 with the game state on the computer 172. In such embodiments, most of the game execution occurs on the computer 172.

In various embodiments, media data 116, additional media data, next media data, etc., are initially sent from the codec 112 via the network 110 and the router 152 to the HMD 104 until a portion of the game program 117 is downloaded to the computer 172 from the game cloud 102. For example, initially, the user uses the game access application to access the game program 117. When the game program 117 is accessed, the media data 116, the additional media data, the next media data, etc., is sent from the codec 112 via the network 110 and the router 152 to the HMD 104 for display on the display screen of the HMD 104. During the time of access of the media data from the game cloud 102 for display on the HMD 104, the NIC 174 of the computer 172 downloads a portion of the game program 117 from the game cloud 102 via the network 110 and the router 152.

In some embodiments, when the game program 117 is accessed by the computer 172, media data, e.g., the media data 116, the additional media data, the next media data, etc., is sent from the codec 112 via the network 110 directly to the HMD 104 for display on the display screen of the HMD 104 by bypassing the computer 172 while the computer accesses the game program on the game cloud for downloading. The received media data is rendered on the display of the HMD 104. Meanwhile, the NIC 174 of the computer 172 downloads a portion of the game program 117 from the game cloud 102 via the network 110 and the router 152.

In a number of embodiments, a portion of input data generated based on the head motions and/or hand motions and/or a portion of the real-world environment data is sent from the HMD 104 via the router 152 and the network 110 to the codec 112 of the game cloud 102 while the remaining portion of the input data and/or the remaining portion of the real-world environment data is sent from the communications circuit of the HMD 104 to the communications circuit 178 of the computer 172.

In various embodiments, a portion of input data generated based on the hand motions is sent from the communications circuit of the HHC 106 via the router 152 and the network 110 to the codec 112 of the game cloud 102 and the remaining portion of the input data is sent from the communications circuit of the HHC 106 to the communications circuit 178 of the computer 172 either through the HMD or directly.

In various embodiments, media data, e.g., the media data 116, the additional media data, the next media data, etc., that is generated by executing the game program 117 using the user input received from the computer/HMD/HHC, is sent from the codec 112 of the game cloud 102 via the network 110 and the router 152 to the HMD 104 for rendering on the display screen of the HMD 104 as part of game play and media data that is generated by execution of the portion of the game program 117 by the processor 176 of the computer 172 is sent from the communications circuit 178 of the computer 172 to the HMD 104 for display on the display screen. In these embodiments, the game cloud 102 and the computer 172 have synchronized game states. For example, the codec 112 sends a game state generated by execution of the game program 117 via the network 110 and the router 152 to the NIC 174 of the computer 172 to inform the computer 172 of the game state. As another example, the NIC 174 of the computer 172 sends a game state generated by execution of the portion of game program 117 on the computer 172 via the router 152 and the network 110 to the codec 112 of the game cloud 102 to inform the one or more game cloud servers of the game state. The communication between the codec 112 of the game cloud 102 and the NIC of the computer are done periodically to keep the game states synchronized on both sides.

In several embodiments, media data, e.g., the media data 116, the additional media data, the next media data, etc., that is generated by executing the game program 117 and sent from the codec 112 of the game cloud 102 to the HMD 104 has a higher amount of graphics than media data that is generated by the processor 176 of the computer 172. As is evident, in some of the embodiments, the computer 172 is bypassed when the media data is directly sent from the codec 112 of the game cloud 102 via the network 110 to the HMD 104.

In some embodiments, the computer 172 requests a portion of the game program 117 from the game cloud 102 via the NIC 174 and in response, the portion 117b of the game program 117 encoded by the codec 112 is streamed via the network 110 to the NIC 174 of the computer 172. In some embodiments, the game cloud includes a games database 131 from which the game program 117 is retrieved and downloaded to the computer 172. In some embodiments, a portion 117a of the game program 117 is downloaded from the games database 131 on to the game server 102 and the remaining portion 117b of the game program 117 is downloaded to the computer 172. In some embodiments, the portion 117b that is downloaded to the computer 172 is the entire game. The processor 176 of the computer 172 executes the portion 117b of the game program 117 to generate media data, additional media data and next media data (collectively termed 'media data') which is sent from a communications circuit 178, a network interface controller, etc., of the computer 172, to the HMD 104 for display on the display screen of the HMD 104.

As mentioned earlier, the additional media data and next media data may be provided in response to input data, including head motions/other user input, hand motions, etc., received from the HMD 104. In addition to the head motions and/or hand motions the input data, in one embodiment, may also include real-world environment data that is captured by an external camera 101 disposed on the outside face of the HMD 104 and transmitted by the communications circuit of the HMD 104.

In some embodiments, the real-world environment data captured by the external camera 101 is stored locally within the HMD and used in rendering on the HMD screen. The additional media data provides virtual reality related data for rendering the virtual game scenes on the HMD and the next media data provides changes to virtual game objects and/or virtual reality data displayed within the virtual game scenes during game play. A communications circuit of the HMD 104 receives the media data as a media stream from the computer 172 and sends the media data to the microcontroller of the HMD 104 for interpretation and display on the display screen of the HMD 104. When the game objects, e.g., real game objects, virtual game objects, etc., and/or virtual environment changes, a game state of the game displayed by execution of the game program 117, changes.

In some embodiments, a portion 117-a of the game program 117 is executed on the game cloud 102 while the game program 117 is being downloaded on to the computer 172. Accordingly, media data associated with the execution of the portion 117-a of the game program 117 on the game cloud 102, are sent directly from the codec 112 via the network 110 and the router 152 to the HMD 104 for rendering on the HMD until the portion 117-b of the game program 117 is downloaded to the computer 172 from the game cloud 102. In one embodiment, the portion 117-b of the game program 117 is downloaded and stored in the local storage 113 of the computer 172 and executed by the processor 176. Once the portion 117-b is downloaded and the processor 176 of the computer 172 starts executing the game portion 117-b, the media data will be transmitted from the computer 172 to the HMD 104 for the portion 117-b of the game program 117. In some embodiments, all the media data for the game program are transmitted directly from the computer 172 to the HMD 104 for rendering. The computer 172 may also periodically transmit the media data to the game cloud 102 to synchronize the game state of the game program on the game cloud 102 with the game state on the computer 172.

In a number of embodiments, a portion of input data based on the head motions and/or hand motions are captured by an observation camera (not shown) that is connected to the computer 172. in some embodiments, the connection between the observation camera and the computer 172 may be a wired connection. In other embodiments, the connection between the observation camera and the computer 172 may be a wireless connection. In some embodiments, the observation camera is any one or combination of stereo camera, IR camera or mono-camera. In some embodiments the observation camera is one of a video camera or a still-motion camera. The images captured by the observation camera may be used to determine the location and motion of the HMD and the HHC. For example, the images of the observation camera may be used to identify coordinates of a position of the HMD and coordinates of a position of the HHC. In addition to the coordinates of the coordinate plane, the images of the observation camera may be used to determine the pitch, the yaw and the roll to generate the six-axis data for the HMD and HHC. In some embodiments, the head and/or hand motions generated at the HMD and the HHC are captured by the observation camera and transmitted to the microcontroller of the HMD 104 as six axis data. The six-axis data from the HMD 104 and/or HHC 106 are interpreted to generate the input data. The interpreted input data is transmitted from the HMD 104 to the computer 172 to influence the outcome of the game program. In some embodiments, the head and/or hand motions captured by the observation camera are directly transmitted to the processor 176 where it is interpreted to generate the six-axis data. The observation camera observes the motions (head and/or hand) of the user and this information is used in providing feedback to the game program to influence the game state changes. In this embodiment, any other input data related to the game program 117 are transmitted by the HMD 104 to the processor and the processor 176 interprets the other input data with the six-axis data to determine if the game state of the game needs to be altered. Based on the interpretation, the game state of the game is changed. In some embodiments, the input data from the HMD 104 includes real-world environment data captured by the external camera 101 and sent from the communications circuit of the HMD 104 to the communications circuit 178 of the computer 172. The real-world environment data may be used to influence the virtual game scenes rendered at certain portions of the screen of the HMD 104. In various embodiments, the HMD 104 is used to display a two-dimensional or a three-dimensional image.

In some embodiments, the observation camera may be a video camera that tracks the motions provided at the HMD and the HHC. The observation camera captures image of various marker elements disposed on the face plate of the HMD and the HHC, and correlates the position of the marker elements of the HMD and the HHC to a three-dimensional space. Each marker element may be a light emitting diode, an infrared light, a color, a reflective material, an object with special features or characteristics that are easily recognized via image analysis, etc. In addition, the HMD 104 may also include special visual markers (not shown), such as reflective areas of particular geometrical shape, areas with a particular color (e.g., blue rectangle, etc.), or markings (e.g., three parallel lines on the surface of the HMD). In some embodiments, the HMD also includes additional marker elements on the side and/or back of the HMD (i.e., the part of the HMD touching the back of the head) to further visually track the location of the HMD by detecting the respective lights or visual markers.

In various embodiments, the observation camera may be a mobile video camera. For example, the video camera (not shown) may be attached to a robotic device, e.g., a multi-copter, a robotic arm, a robot, a robotic vehicle, a robotic car, a quadcopter, etc. For example, the video camera may be attached under, on top of, to a side of the robotic device for capturing images of the HMD and/or the HHC. The HMD moves with movement of a head of the user 108. In several embodiments, instead of the video camera, a digital camera may be used.

In some embodiments, the observation camera may be a stereo camera, which is a camera that includes two or more lenses with separate image sensor for each lens. The separate image sensor enables the stereo camera to capture three-dimensional images of an object that provide an illusion of depth.

In another embodiment, the observation camera may be an infrared (IR) camera that is used to analyze infrared light provided on the HMD. The infrared light is not visible to the human eye but can be easily detected by the infrared camera. The HMD may include infrared lights to avoid distraction in the appearance of the HMD. In some environments (e.g., low light or bright light), it may be easier to track infrared light than other types of lights for detecting location, shape and or features in the HMD. The infrared (IR) cameras provide enhanced imaging and thermal imaging of a tracking object, such as the HMD. The IR cameras may also be used as gaze detection cameras to detect user's gaze direction.

In yet another embodiment, the observation camera may be a regular camera. In some embodiments, the observation camera may be a mono camera, wherein the lens (i.e., single lens), is used to track the lights or other marker elements in the HMD that are configured for visual tracking. In order to determine the depth of the HMD within the field of play with the regular camera, the size of some of the features on the HMD are analyzed. The smaller the features are, the further away the features are supposed to be from the camera of the HMD. In some embodiments, the depth of the HMD within the field of play may be determined by using more than one observation camera. In addition, the visual tracking may also be combined with other types of tracking, such as inertial motion tracking, dead reckoning, ultrasound communication between the HMD and the computing device, etc.

The observation camera captures an image of the HMD 104 by tracking the one or more marker elements of the HMD. When the head of the user 108 tilts or moves, position and location of the marker elements of the HMD changes in a coordinate system. The digital camera captures an image of the marker elements and sends the image to the computer 172. An image of the marker elements is an example of input data. Position of the HMD 104 in a three dimensional space (X, Y, Z) can be determined by the processor 176 of the computer 172 based on the positions of the marker elements in the images. Further, inertial motion, e.g., yaw, pitch, and roll, etc., of the HMD 104 is determined by the processor 176 of the computer 172 based on movement of the marker elements. In the cases where the computer 172 is not available, the image of the marker elements from the observation camera are sent to the processor of the HMD 104 and the HMD's processor will determine the position of the HMD using the coordinates of the marker elements.

In some embodiments, the observation camera captures an image of the HHC 106. When the hand of the user 108 tilts or moves, position and location of the marker elements on the HHC changes in a coordinate system. The observation camera captures an image of the marker elements on the HHC and sends the image to the computer 172 or to the processor of the HMD 104. An image of the marker elements on the HHC is an example of input data. Position of the HHC 106 in a three dimensional space (X, Y, Z) can be determined by the processor 176 of the computer 172 or by the processor of the HMD 104 by analyzing the positions of the marker elements on the HHC in the image. Moreover, inertial motion, e.g., yaw, pitch, and roll, etc., of the HMD 104 is determined by the processor 176 of the computer 172 or the processor of the HMD 104 based on movement of the marker elements of the HHC.

In some embodiments wherein the HMD 104 is communicatively connected to the computer 172 using a wired connection, the HMD is configured to detect a break in the wired connection so as to pause the virtual game scenes rendered on the screen of the HMD 104. The HMD detects a break in the communication connection, generates a signal accordingly and relays the signal to the computer 172 to cause the computer 172 to pause the execution of the game program and to store the game state and game scenes for the session for the game. Power from a battery of the HMD may be used to provide the power for communicating with the computer 172 during the break in the communication connection, the status of the connection. The execution of the game program may resume as soon as the computer 172 gets a signal from the HMD 104 that the wired connection has been re-established. In some embodiments, upon resumption of the connection between the HMD and the computer 172, the computer 172 may start streaming the game scenes from the point of disruption. In another embodiment, the computer 172 may start streaming the game scenes from a point before the pause (for example, few hundred frames before the pause) caused by the connection disruption so that the user may get some time to immerse in the game. In this embodiment, the computer 172 may allow the user to re-execute portions of the game to allow the user to get into the game. The communication between the HHC and the HMD and the communication between the HHC and the computer 172 may follow a wireless communication protocol.

In some embodiments, the HMD 104 may include one or more internal cameras (e.g., gaze detection cameras) 103 to detect changes in the user's eyes movement, gaze direction, gaze pattern, etc. The internal cameras 103 may also be used to identify/authenticate the user before providing access to the game.

Although detailed description is provided regarding a gaming environment, it is envisioned that the interfacing can also take place during interactive communication with a computer system. The computer system can be a general computer, with a graphical user interface that allows user to present and make gestures in space, that control icons, entry, selection, text, and other commands.

For more information regarding the method for following a marked object, reference may be made to U.S. Patent Application Publication No. 2012-0072119, filed on Aug. 15, 2011 and published on Mar. 22, 2012, and U.S. Patent Application Publication No. 2010-0105475, filed on Oct. 27, 2008 and published on Apr. 29, 2010, both of which are herein incorporated by reference in its entirety.

In some embodiments, one or more pairs of stereo camera, one or more infrared cameras and/or one or more regular camera or combinations thereof may be used to determine the relative position of the HMD and the motion of the HMD provided by user's head motion as well as the controller, including the user's hand wearing a wearable article/device that is used to provide input data.

The one or more internal cameras (e.g., gaze detection cameras, etc.) may be mounted on the HMD and facing inward toward the user to capture images related to the user and feed the images to the communication module to provide user specific and environment specific data to the HMD. The internal camera(s) may be used to identify a user wearing the HMD, which can be used to obtain user profile of the user. Accordingly, the internal cameras may be configured to engage retinal scanning technique and/or iris scanning technique to scan the user's retina or iris and use the data from the scanning to generate at least one biometric identity of the user. The user's biometric identity may be part of the user's profile. The internal cameras may also include a gaze detection camera that are equipped with gaze detector algorithm to detect the direction of the user's gaze and to adjust the image data rendered on a screen of the HMD based on the detection. In some embodiments, the internal cameras are IR cameras. The gaze detection technology may also be used to authenticate a user. For example, the user may be asked to follow an object rendered on the screen or track a randomly generated letter, object or pattern (for e.g., a circle, a triangle, a rectangle, etc.) that is rendered on the screen. In some embodiments, verbal or textual commands may be provided for a user to track a letter, an object or pattern on the screen and the user authenticated by using the gaze detection technology. The authentication of a user may be used to allow access to a user account, to a game, to certain parts or levels of a game, etc.

The internal cameras and the external cameras of the HMD work hand-in-hand to determine the gaze of the user and to relate the gaze to an object in the line-of-sight of the user's gaze. The game processing module of the HMD includes the software to compute the direction of the user's gaze and correlate it to objects within the field of view of the computed direction.

For example, the internal cameras 109 detect and track the user's eye movement and gaze. The internal cameras 109 may be used to determine the user's gaze direction for a period of time (e.g., when the user is looking at a particular object or point in the images rendered on the display screen, for some period of time), detect a gaze pattern over a period of time (for e.g., when a user follows an object, traces a pattern, etc.), and/or detect changes in gaze directions (for e.g., back-and-forth movement of the eyes, rolling of the eyes—which may be a sign of the user experiencing dizziness or fatigue—especially in a high intensity game, etc.). The HMD's internal cameras communicate with the outside mounted cameras of the HMD and with the observation cameras to determine if data provided for rendering on the screen of the HMD needs to be adjusted, in response to detected eye movement or gaze or based on triggered events occurring within the game or in the environment in the immediate vicinity of the user wearing the HMD.

Figure 2:
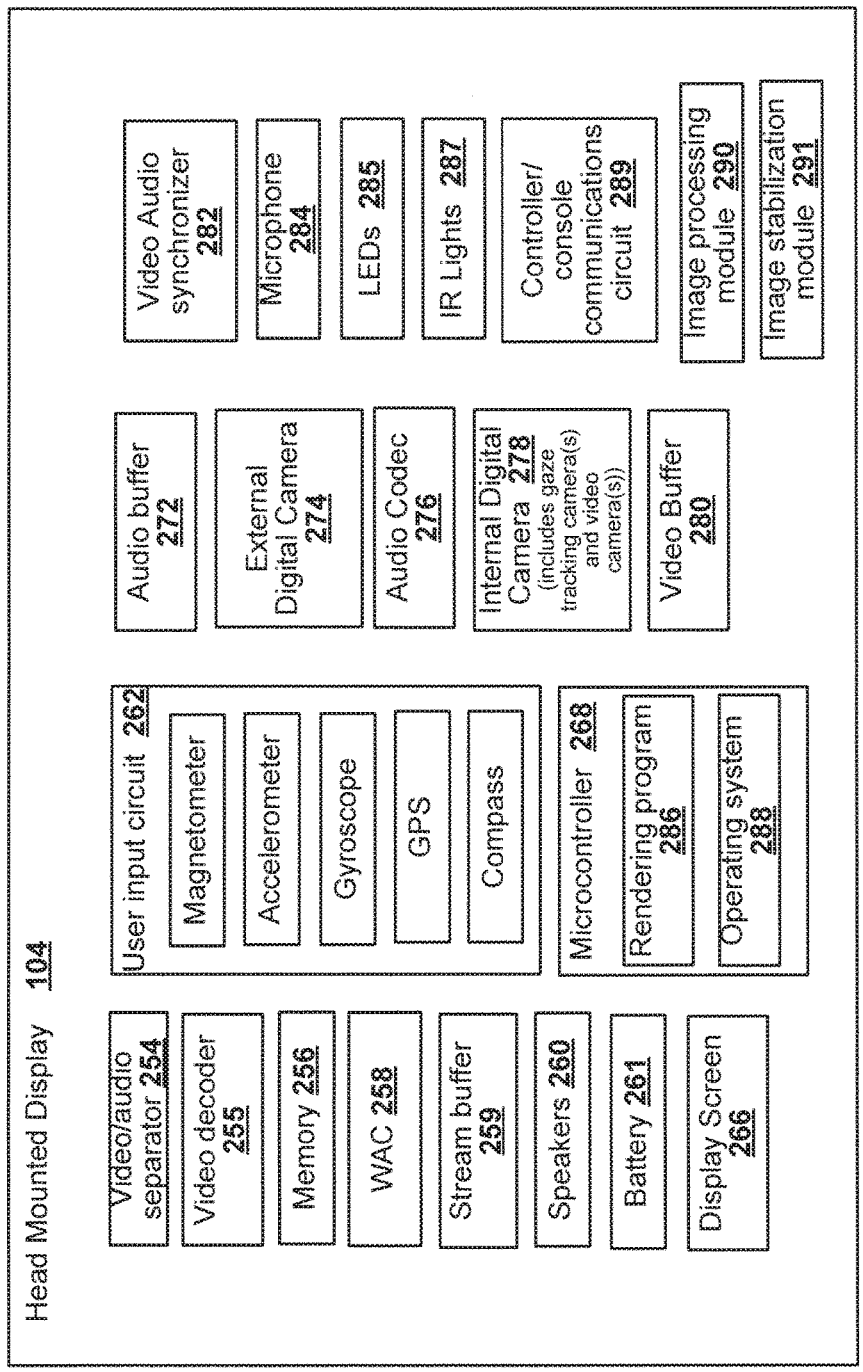
FIG. 2 illustrates specific ones of the modules of the HMD that are used in generating a signal to adjust a zoom factor of one or more forward facing cameras of the HMD, in accordance to an embodiment of the present invention.

FIG. 2 is a block diagram of a communication architecture of an HMD 104. The HMD 104 includes some exemplary control modules or sensors, such as a video audio separator 254, a video decoder 255, a memory device 256, a WAC 258, a stream buffer 259, one or more speakers 260, a battery 261, a user input circuit 262, a display screen 266, a microcontroller 268, an audio buffer 272, an observation digital camera 274, an external digital camera 274, an audio codec 276, an internal digital camera 278, a video buffer 280, a video audio synchronizer 282, a microphone 284, LEDs 285 and IR lights 287, a controller/computer communications circuit 289. The LEDs 285 and IR lights 287 represent the marker elements that are used to track the position of the HMD.

In a number of embodiments, the speakers 260 form an audio circuit. In various embodiments, the audio codec 276, the audio buffer 272, and/or the speakers 260 form an audio circuit. In various embodiments, the microcontroller 268 is part of a display circuit that controls images rendered on a display screen. Examples of a display screen 266 include an LED screen, a liquid crystal display (LCD) screen, a liquid crystal on silicon (LCoS) screen, an organic LED (OLED) screen, a plasma screen, etc. An example of the external digital camera includes an eye camera, such as Playstation Eye® manufactured by Sony Computer Entertainment, Inc.

The microcontroller 268 stores a rendering program 286 and an operating system 288. The rendering program 286 and the operating system 288 are stored in a memory device of the microcontroller 286 and executed by a microprocessor of the microcontroller 268. An example of microcontroller 268 includes a low cost microcontroller that includes a driver, e.g., an LCD driver, that generates a signal to detect elements (for e.g., LCDs, etc.), to provide media data, for displaying on the display screen 266. Another example of the microcontroller includes a GPU and a memory device.

In some embodiments, the memory device of the microcontroller is other than a flash memory or a random access memory (RAM). For example, memory device of the microcontroller is a buffer. In various embodiments, memory device of the microcontroller is a flash memory or a RAM. Examples of the user input circuit 262 include a gyroscope, a magnetometer, and an accelerometer. In some embodiments, the user input circuit 262 also includes a global position system (GPS), compass or any location tracking devices. An example of the WAC 258 includes a NIC. In some embodiments, the WAC 258 is referred to herein as a communications circuit.

A stream of encoded media data is received into the stream buffer 259 from the network 110 or the router 152. It should be noted that when the router 152 is coupled to the computer 172, data received from the computer 172 is stored in a buffer (not shown) of the HMD 250 or in the memory device 256 instead of being stored in the stream buffer 259.

The WAC 258 accesses the stream of encoded media data from the stream buffer 259 received from the computer or the codec 112 and de-packetizes the stream. The WAC 258 also includes a decoder to decode the encoded media data.

In embodiments in which the stream of encoded media data is received by the computer 172 via the router 152, the NIC 174 of the computer 172 de-packetizes and decodes the stream of encoded media data to generate decoded data, which is stored in the buffer (not shown) of the HMD 250.

The decoded data is accessed by the video audio separator 254 from the WAC 258 or from the buffer (not shown). The video audio separator 254 separates audio data within the decoded data from video data.

The video audio separator 254 sends the audio data to the audio buffer 272 and the video data to the video buffer 280. The video decoder 255 decodes, e.g., the video data and/or changes to the video data from a digital form to an analog form to generate analog video signals. The video audio synchronizer 282 synchronizes the video data stored in the video buffer 280 with the audio data stored in the audio buffer 272. For example, the video audio synchronizer 282 uses a time of playback of the video data and the audio data to synchronize the video data with the audio data.

The audio codec 276 converts the synchronized audio data from a digital format into an analog format to generate audio signals and the audio signals are played back by the speakers 260 to generate sound. The microcontroller 268 executes the rendering program 286 to display a game on the display screen 266 based on the analog video signals that are generated by the video decoder 255. In some embodiments, the game displayed on the display screen 266 is displayed synchronous with the playback of the audio signals.

Moreover, the user speaks into the microphone 284, which converts sound signals to electrical signals, e.g., audio signals. The audio codec 276 converts the audio signals from an analog format to a digital format to generate audio data, which is stored in the audio buffer 272. The audio data stored in the audio buffer 272 is an example of input data generated based on a sound of the user. The audio data may also include other audio signals generated at the HMD or detected by the speakers in the HMD. The audio data is accessed by the WAC 258 from the audio buffer 272 to send via the network 110 to the codec 112 of the game cloud 102. For example, the WAC 258 packetizes and encodes the audio data accessed from the audio buffer 272 to send via the network 110 to the codec 112.

In some embodiments, the audio data is accessed by the WAC 258 from the audio buffer 272 to send via the router 152 and the network 110 to the codec 112 of the game cloud 102. For example, the WAC 258 packetizes and encodes the audio data accessed from the audio buffer 272 to send via the router 152 and the network 110 to the codec 112.

The internal digital camera 278 captures one or more images of the eye motions of the user wearing the HMD to generate image data, which is an example of input data generated at the HMD. based on the head actions and/or eye movements. Similarly, the observation digital camera 274 and/or the external digital camera 274 mounted on the HMD captures one or more images of the hand of the user 108, and/or of the markers located on the HMD 250 and/or on the HHC/glove/hand of the user 108, head motions of the user wearing the HMD, to generate image data, which is an example of input data that is generated based on the hand/head motions. The image data captured by the digital cameras 274, 275 and 278 is stored in the video buffer 280.

In some embodiments, the image data captured by the digital cameras 274, 275 and 278 is stored in a buffer of the HMD 250 and the buffer is other than the video buffer 280. In various embodiments, the image data captured by the digital cameras 274, 275 and 278 is decoded by the video decoder 255 and sent to the microcontroller 268 for display of images on the display screen 266.

The image data captured by the digital cameras 274, 275 and 278 is accessed by the WAC (wireless access card) 258 from the video buffer 280 to send via the network 110 to the codec 112 of the game cloud 102. For example, the WAC 258 packetizes and encodes the image data accessed from the video buffer 280 to send via the network 110 to the codec 112.

In some embodiments, the video data is accessed by the WAC 258 from the video buffer 280 to send via the router 152 and the network 110 to the codec 112 of the game cloud 102. For example, the WAC 258 packetizes and encodes the video data accessed from the video buffer 280 to send via the router 152 and/or the network 110 to the codec 112.

The controller/console communications circuit 289 receives media data from the computer 172 for storage in the buffer (not shown). Moreover, the controller/console communications circuit 289 receives input signals from the HHC 106, converts the input signals from an analog form to a digital form to generate input data, which is accessed by the WAC 258 to send via the network 110 to the codec 112 of the game cloud 102. For example, the WAC 258 packetizes and encodes the input data accessed from the controller/console communications circuit 289 to send via the network 110 to the codec 112.

In some embodiments, the input data is accessed by the WAC 258 from the controller/console communications circuit 289 to send via the router 152 and the network 110 to the codec 112 of the game cloud 102. For example, the WAC 258 packetizes and encodes the video data accessed from the video buffer 280 to send via the router 152 and the network 110 to the codec 112.

It should be noted that instead of the controller/console communications circuit 289, two separate communications circuits may be used, one for communicating, e.g., receiving, sending, etc., data with the computer 172 and another for communicating data with the HHC 106.

In a number of embodiments, the decoder is located outside the WAC 258. In various embodiments, the stream buffer 259 is located within the WAC 258.

In some embodiments, the HMD 104 excludes the observation digital camera 274. In several embodiments, the HMD 104 includes any number of microcontrollers, any number of buffers, and/or any number of memory devices.

In various embodiments, the HMD 104 includes one or more batteries 261 that provide power to components, e.g., the video audio separator 254, the memory device 256, the wireless access card 258, the stream buffer 259, the one or more speakers 260, the user input circuit 262, the display screen 266 the microcontroller 268, the audio buffer 272, the external digital camera 274, the audio codec 276, the internal digital camera 278, the video buffer 280, the video audio synchronizer 282, the microphone 284, and the controller/computer communications circuit 289. The one or more batteries 261 are charged with a charger (not shown) that can be plugged into an alternating current outlet.

In a number of embodiments, input data and/or media data is referred to herein as interactive media.

In some embodiments, the HMD 104 includes a communications circuit to facilitate peer-to-peer multichannel communication between local users via pairing. For example, the HMD 104 includes a transceiver that modulates sound signals received from the microphone 284 and sends the modulated signals via a channel to a transceiver of another HMD (not shown). The transceiver of the other HMD demodulate the signals to provide to speakers of the other HMD to facilitate communication between the users.

In various embodiments, different channels are used by the transceiver of the HMD 104 to communicate with different other HMDs. For example, a channel over which the modulated signals are sent to a first other HMD is different than a channel over which modulated signals are sent to a second other HMD.

In some embodiments, the WAC 258, the user input circuit 262, the microcontroller 268 and the video decoder 255 are integrated in one or more individual circuit chips. For example, the WAC 258, the video decoder 255 and the microcontroller 268 are integrated in one circuit chip and the user input circuit 262 is integrated into another circuit chip. As another example, each of the WAC 258, the user input circuit 262, the microcontroller 268 and the video decoder 255 is integrated in a separate circuit chip.

The various modules of the HMD are used to detect user's gaze direction and/or actions at the HMD and adjust the images presented on the display screen of the HMD to correspond with the detected gaze direction and/or actions.

FIG. 3 illustrates a broad overview of the various communication modules that are involved within the HMD and the computer to detect gaze direction and/or actions provided by the user and to adjust the images presented at the display screen of the HMD, in some embodiments. It should be noted that only a few of the modules are shown to be involved in adjusting the images that are being presented at the display screen of the HMD, but in reality other modules within the HMD are involved in the process of adjusting the images presented on the HMD. The embodiments may be used to provide augmented reality of the real-world environment by enhancing a portion of the images of the real-world environment captured by one or more forward facing cameras mounted on the HMD. Alternately, the embodiments may be used to adjust virtual reality (VR) scene presented at the HMD. The VR scene may be from a pre-recorded video of a game play of a user, a pre-recorded video of a place or event, a game scene of a video game, etc.

In one embodiment, the HMD is used to augment real-world environment. In this embodiment, the various components of the HMD 104 work with components of the computer 172 to detect a gaze direction of the user and to enhance certain portion(s) of the images rendered on the screen of the HMD that is in line with the detected gaze direction of the user.

In this embodiment, the controller/console communication circuit (or simply referred to herein as "CC communication circuit") 289 of the HMD 104 receives images of a real-world environment captured from a vicinity of the user wearing the HMD 104 by one or more forward facing cameras 274, as image frames. The image frames are processed by the CC communication circuit 289. As part of the processing, the image frames may be encrypted in accordance to communication protocol established for the communication connection between the HMD and the computer 172, and streamed to the computer 172.

The communication device 178 of the computer 172 receives the streaming image frames and decrypts the data and forwards the decrypted image data to the processor. The processor includes an image analyzing module (not shown) that is configured to analyze the image data by constructing a three dimensional model of the real-world environment captured in the images using different modeling tools that are well-known in the industry (e.g., using multiple stereoscopic cameras). The three dimensional model is maintained in memory and updated as and when new image data is received from the HMD. In some embodiments, the processor may generate a two-dimensional format of the images and forward the same to the HMD for rendering on the display screen of the HMD. For more information on converting image data from the three-dimensional format to a two-dimensional format, reference can be made to application Ser. No. 14/220,420, filed on Mar. 20, 2014, and entitled, "Sharing Three-Dimensional Gameplay," which is incorporated herein by reference in its entirety. During the viewing of the real-world environment, images from a gaze detection camera may be simultaneously received, processed by the CC communication circuit and forwarded to the computer as gaze image frames. The image analyzing module analyzes the gaze image frames to identify the gaze direction of the user. When it is determined that the user's gaze is directed to a particular portion of the display screen of the HMD, the image analyzing module may correlate the detected gaze direction of the user to an object or point within the generated model of the real-world environment to identify an object or point that has captured the user's attention.

The image analyzing module continues to track the gaze direction of the user over the duration of viewing of the real-world environment. When it is determined that the user's gaze has been directed to the object or point for a pre-defined period of time, the image analyzing module may generate a signal instructing the HMD to adjust a zoom factor for lens of the one or more forward facing cameras so that the object or point of interest to the user can be zoomed in. In some embodiments, the signal to adjust the zoom factor may include a signal to adjust a focal length of the lens of the forward facing cameras so as to cause the camera to zoom in on the object. In some embodiments, the signal to adjust the focal length may include signal to control speed of adjusting the focal length. The speed of adjustment of the focal length may be driven by the type of content that is being captured in the real-world environment or may depend on the user. For example, if the user is able to handle a faster zoom in, the speed of adjusting the focal length may be set high as opposed to a user who cannot handle faster zoom in. In some embodiments, the signal to adjust the zoom factor may also include a signal to adjust an aperture setting of lens of the one or more forward facing cameras so as to affect the depth at which the image of the object is captured. In addition to providing a signal to adjust the focal length and speed, the signal may also include a signal to adjust brightness level of the screen (i.e., screen of the HMD or an external display surface) so that the object rendered on the screen appear clear and in focus.

In some embodiments, the signal may be generated to enhance the audio component captured in the image frames of the real-world environment. In such embodiments, the signal may be generated to adjust only the audio component. For example, the signal to adjust the audio component may be generated when it is determined that the user wearing the HMD is approaching an edge of a VR scene or a boundary of an interactive region defined for the user in the physical environment or is getting proximal to an object or person in the physical environment.

In alternate embodiments, only the video component may be enhanced. In some embodiments, a command to enhance the audio, video or both the audio and video components of the image frames may be provided by a user. In such embodiments, the CC communication circuit may receive and forward the command from the user to the computer so that the image analyzing module in the computer can identify the appropriate component or portion of the real-world images that need to be enhanced. In some embodiment, the command may be provided through audio commands and such audio commands may be received through the microphone controller 284, processed by the CC communication circuit 289 and forwarded to the computer for further processing. The computer processes the commands and generates appropriate signal to the HMD so that the relevant content rendering components may be adjusted to provide an enhanced content.

Figure 4A:
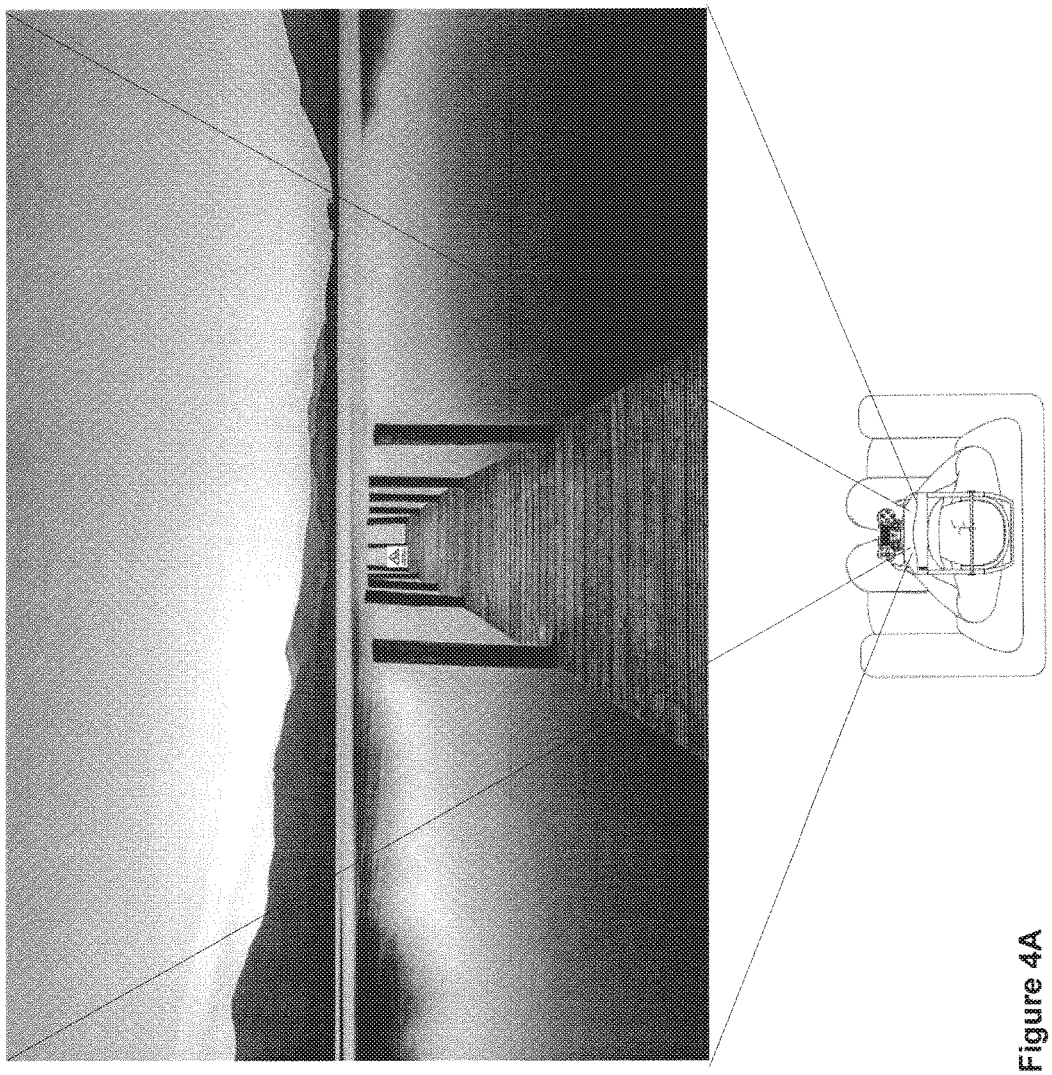
FIGS. 4A-4C illustrate various stages involved in bringing an object into focus in response to detecting a gaze direction of a user, in some embodiments of the invention.
Figure 4B:
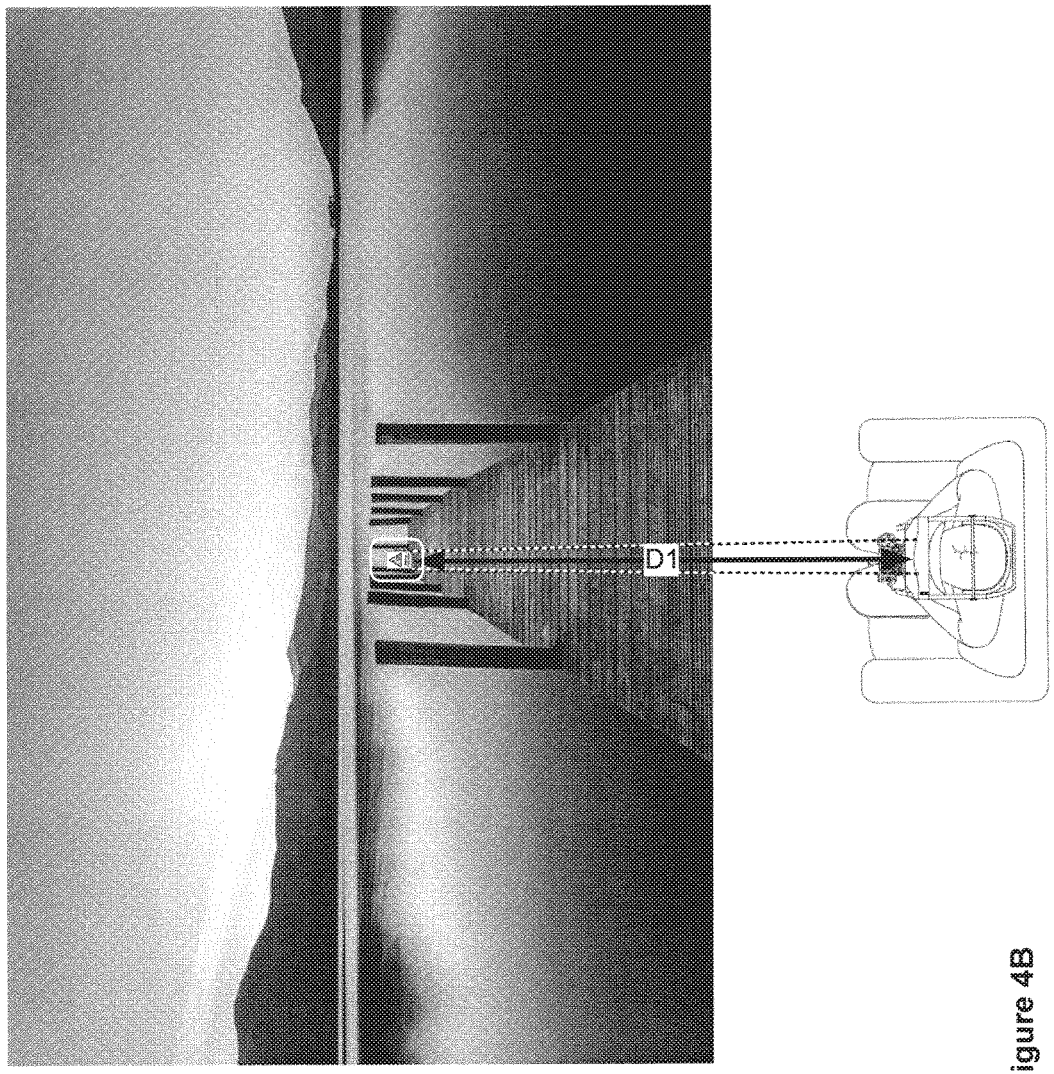
Figure 4C:
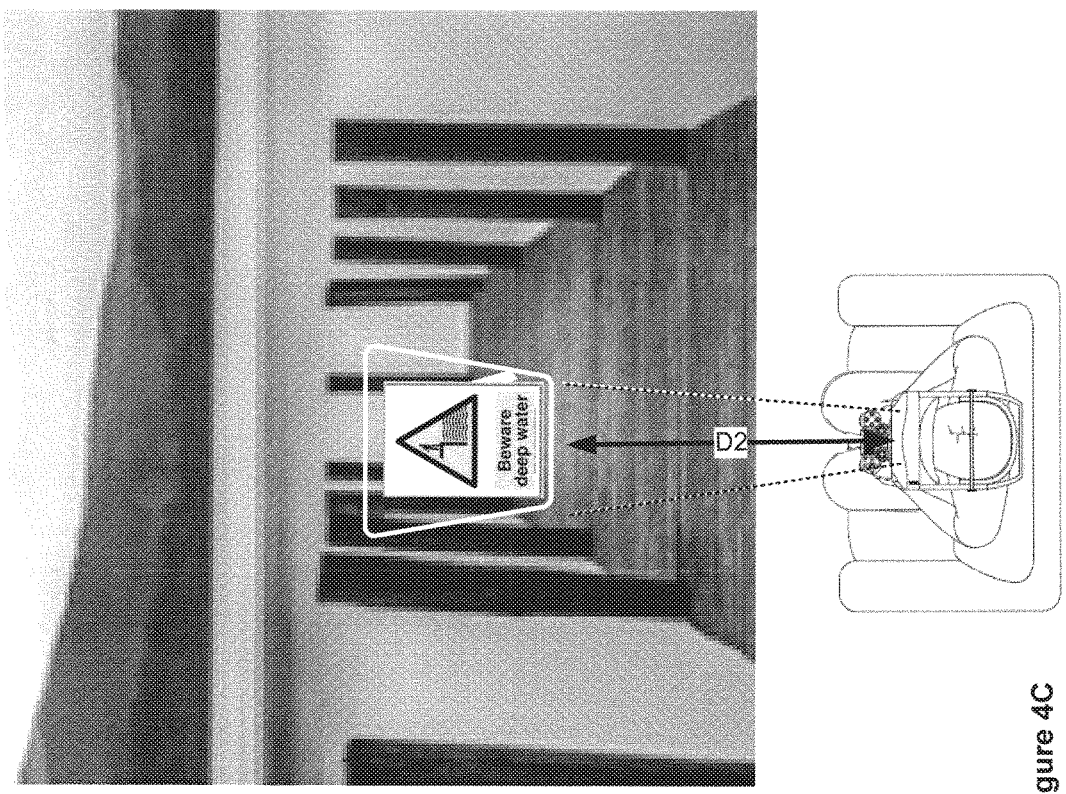

FIGS. 4A-4C illustrate an example of adjusting an image of a real-world environment that is rendered at the HMD, in response to detecting a gaze direction of a user, in one embodiment. FIG. 4A illustrates a user viewing a real-world lake scene captured by the forward facing cameras of the HMD and rendered on a display screen of the HMD, at time t0. While rendering the lake scene, the gaze detection cameras keep track of the user's gaze direction to determine if the user's gaze is fixed on a point or object rendered on the display screen. In one embodiment, images captured by gaze detection camera(s) is analyzed to identify that the user's gaze direction is indeed directed toward a particular portion or point of the display screen. It is then determined if the user's gaze direction toward the particular portion or point of the display screen lasts for at least a pre-defined period of time. If it is determined that the user's gaze has shifted, no trigger event is initiated by the HMD and the HMD continues to render the images from the lake scene. If, however, it is determined that the user's gaze continues to be directed toward the particular portion or point of the display screen for at least the pre-defined period of time (e.g., 4 seconds, 6 seconds, etc.), a trigger event is initiated at the HMD. As part of initiating the trigger event, images from the gaze detection cameras are forwarded as gaze detection image frames to the computer, for processing, in one embodiment. In another embodiment, the coordinates of the particular portion or point of the display screen is computed at the HMD and forwarded to the computer as user gaze data for further processing.

In the embodiment where gaze detection image frames are provided, an image analyzing module available at the computer is used to analyze the gaze detection image frames and correlate the user's gaze direction to a particular object or point in the lake scene by mapping the gaze direction to a three-dimensional model of the lake scene generated by the image analyzing module. As shown in FIG. 4B, based on the analysis, it is determined that the user's gaze direction corresponds to a message board that is at the end of a pier within the lake scene. Further, the analysis identifies that the object (i.e., message board) is rendered at a virtual distance D1 on the display screen making the message hard for the user to read.

In the embodiment where the user gaze data identifying coordinates is provided to identify the particular portion or point of the display screen, the image analyzing module available at the computer correlates the coordinates provided in the user gaze data to the particular object or point in the lake scene. In some embodiments, the coordinates are provided in three-dimensional format and the image analyzing module may correlate the coordinates to a three-dimensional model generated for the lake scene. In some embodiments, the coordinates are provided in two-dimensional format and the image analyzing module may correlate the coordinates to a two-dimensional model generated for the lake scene.

Upon identifying the particular point or object of interest, the computer forwards a signal to the HMD to adjust the zoom factor of the lens of the forward facing cameras so that the object captured in the lake scene is zoomed in, as illustrated in FIG. 4C. In response to the signal, the object is now presented at a virtual distance D2, wherein D2 is less than D1, thereby making the message board bigger so that the user can read the warning message. The speed of zooming is adjusted to ensure that the zooming in does not cause any discomfort or disorientation to the user. Although the various embodiments discuss enhancing a portion of the image component of the real-world scene captured by the forward facing cameras, the embodiments may be extended to enhance the audio portion or the video portion captured in the real-world environment as well. In some embodiments, the signal to adjust the zoom factor may include a signal to adjust the focal length of the lens of the forward facing cameras. In other embodiments, in addition to or instead of the signal to adjust the focal length, a signal to adjust the aperture of the lens may be included so that the object or point that is enhanced appears sharp. This may entail adjusting the lens aperture to ensure sufficient light passes through to the image sensor to provide a clear and enhanced view of the object that has captured the user's interest. The signal may also specify a speed of such adjustments so as to provide the user with an enhanced image of the object without subjecting the user to any discomfort or causing disorientation or dizziness or motion sickness.

In some embodiments, the HMD and the computer may be used to enhance portions of a virtual reality scene, such as game scene of a video game, currently rendering on the display screen of the HMD. In such embodiments, the controller/console communication circuit (or simply referred to herein as "CC communication circuit") 289 of the HMD 104 receives the game data from the computer 172 in media streams, forwards the media streams to the image processing module 290, where the media streams are decrypted to generate the game data. The image processing module 290 engages other components of the HMD to process different components of the game data. The processed game data is forwarded to corresponding components of the HMD. For example, the image processing module 290 may engage a video/audio separator 254 to separate the video and the audio component of the game data. The image processing module 290 then engages a video decoder 255 (FIG. 2) to decode the video component of the game data to identify video frames and forward the video frames to the display controller for rendering on the display screen. The video decoder 255 may use a video buffer 280 to provide buffering of the video component of the game data before it is forwarded to the display controller (i.e., display screen 266) for rendering. The video buffering is to minimize latency for the game data presented on the display screen 266. Similarly, the image processing module 290 may engage an audio decoder 276 (FIG. 2) to decode the audio component of the game data prior to rendering the audio data on the one or more speakers of the HMD. The audio decoder 276 may use an audio buffer 272 to provide buffering for the audio component of the game data prior to forwarding the audio portion to the speakers of the HMD. Of course, the audio component and the video component are synchronized when presented at the respective components of the HMD.

In some embodiments, during the presentation of the game data, the user's motions and actions are tracked at the HMD to determine if a trigger event needs to be initiated. For example, a trigger event may be initiated at the HMD when it is determined that the user's gaze is directed to a particular object or point on the display screen for at least a pre-defined period of time (e.g., 2 seconds, 5 seconds, etc.). One or more gaze detection camera 278 is engaged to monitor the user's gaze in order to determine the gaze direction of the user. The gaze detection camera tracks the user's gaze and determines the gaze direction by mapping the user's gaze to corresponding portion of content rendered on the display screen of the HMD. When it is determined that the user's gaze has been directed to a particular point, portion or object of content rendered on the screen for a pre-defined period of time, the gaze detection camera captures the images of the user's eyes and forwards the images in image frames to the CC communications circuit 289 for processing. The CC communications circuit 289 analyzes the inputs to detect the gaze direction of the user, initiates a trigger event when it determines that the user's gaze is fixed on a particular point or object of content for at least a pre-defined period of time, and forwards data related to user's gaze (e.g., coordinates, images, etc.) to the communication device 178 of the computer 172. The computer 172 uses the gaze direction data and maps the data to the video images that are currently being provided for rendering on the screen of the HMD to identify the particular point or object of the game data that has captured the user's interest.

In some embodiments, the user's gaze direction may be influenced by a visual cue provided with or in the game data or in the real-world environment. For example, the visual cue may be in the form of a beacon or a directional arrow or a highlight or color flash, etc., at or near an object or point of interest. The visual cue may capture the user's attention leading to a shift in the user's gaze direction toward the object that is rendered at a virtual distance. Alternately, the user's gaze direction may be influenced by change in the user's gaze characteristics, such as narrowing of the user's eyes trying to focus on a particular object that appears at a virtual distance, when rendered on the display screen of the HMD 104. The object or point of interest, for example, may be hard for a user to see clearly. In some embodiments, in response to the initiated trigger event, the computer 172 may generate a signal instructing the game logic to adjust the game data so that the object is brought into focus. In alternate embodiments, the signal may provide instructions to the HMD to adjust the rendering of the images so as to digitally zoom in on the object or point of interest in the VR scene.

In some other embodiments, in response to the occurrence of the trigger event caused by gaze detection, the signal generated by the computer may include instructions to adjust optical settings of the lens of the HMD. For example, the signal may include instructions to adjust a zoom factor for the lens of the HMD so that the object rendered on the screen may be zoomed in and brought into focus. The adjustment to the zoom factor causes a change in the virtual distance at which the object is rendered on the display screen of the HMD from a first virtual distance to a second virtual distance, wherein the second virtual distance is shorter than the first virtual distance. The adjustment in the virtual distance makes it appear that the object is brought closer to the relative position of the user within the VR scene.

In some embodiments, the VR scene may include one or more points or objects that may be of interest to users. As mentioned earlier, the VR scene may be a pre-recorded video provided by a user or a content provider, a recording of a video game play of a user, etc. The pre-recorded video may include one or more objects or points of interest that may have been identified by other users or content provider as being interesting. The objects may be identified using a tag, a beacon, a highlight, color flash, or any other form of visual or audio cue. These visual cues in the VR scene may influence the user to gaze in a particular direction. The image analyzing module in the computer determines the gaze direction of the user and identifies one of the objects or points within the VR scene that have been previously identified and is in line with the gaze direction.

In some embodiments, once the object or point of interest has been identified, the user may be provided with an option to confirm the identity of the object or point of interest. For example, the option may be provided as a button on the HMD or the HHC that is communicatively coupled to the HMD for user selection, an option presented on an user interface at the display screen of the HMD that can be selected using controls provided in the HHC or the HMD, an audio option, a gesture option (e.g., a nod or a wave captured by an external image capturing device, a wink or a blink provided by the user and detected by an image capturing device of the HMD, a tap on an input pad of the HHC or HMD, a swipe action on an input pad of the HHC or HMD, etc.). User selection and/or action provided at the options are captured using the user input circuitry 262 and processed by the CC communication circuit 289. Based on the user selection, a signal may be generated by the computer to the HMD to adjust the zoom factor of the lens of the HMD or to adjust the image of the VR scene so that the selected object may be brought into focus at a virtual distance that makes the object appear clear, sharp and close to the user's eyes to make it discernible.

In some embodiments, an image processing algorithm available at the computer may use the points of interest identified in the VR scene by various users, and define areas that are proximal to the points of interest where a user can be teleported. The areas are pre-defined so as to take into account the terrain attributes near or around the points of interest. For example, if a mountain scene is being presented on the display screen of the HMD, the various points of interest may be identified at different elevations of the mountain as potential vista points. These points of interest are used to define virtual areas for teleporting a user, in some embodiments. When the virtual areas around or proximal to objects or points of interest are defined, the image processing algorithm takes into consideration the terrain or other features of the VR scene. In some embodiments, the pre-defined virtual areas near or around the objects or points of interest in the VR scene may be used to "teleport" the user. These virtual areas are mapped to a physical space in which the user wearing the HMD is operating and define a zone of movement within the physical space for the user to provide interactions while viewing the VR scene.

Teleporting the user, in one embodiment, may include adjusting the image of the VR scene presented on the display screen of the HMD. The adjusting of the image of the VR scene is done in such a manner so as to make it appear that the user has been transferred to a new location defined by the pre-defined virtual area associated with the object or point in the VR scene that has caught the user's interest or attention, as defined, for example, by the gaze direction. In some embodiments, as part of teleporting the user, the image of the VR scene is adjusted so that the VR scene that is rendered at the HMD reflects the view from the pre-defined virtual area. For example, in the mountain scene, as the user is teleported to a pre-defined area that is close to a vista point, the content that is rendered on the display screen of the HMD is a view of the mountain scene as seen from the vista point. After rendering the adjusted content, any movement by the user in the physical space is translated to the user's movement in the teleported pre-defined virtual area at the vista point and the content of the virtual scene is adjusted in accordance to the detected user's movement. For example, if the user moves his head to the right, the scene from the right side of the virtual scene is rendered and when the user moves his head down, the valley scene in line with the user's gaze direction is rendered. In some embodiments, the adjustment to the VR scene is performed for a pre-defined period of time and after expiration of the pre-defined period of time, the image of the VR scene before the adjustment is rendered.

Figure 5A:
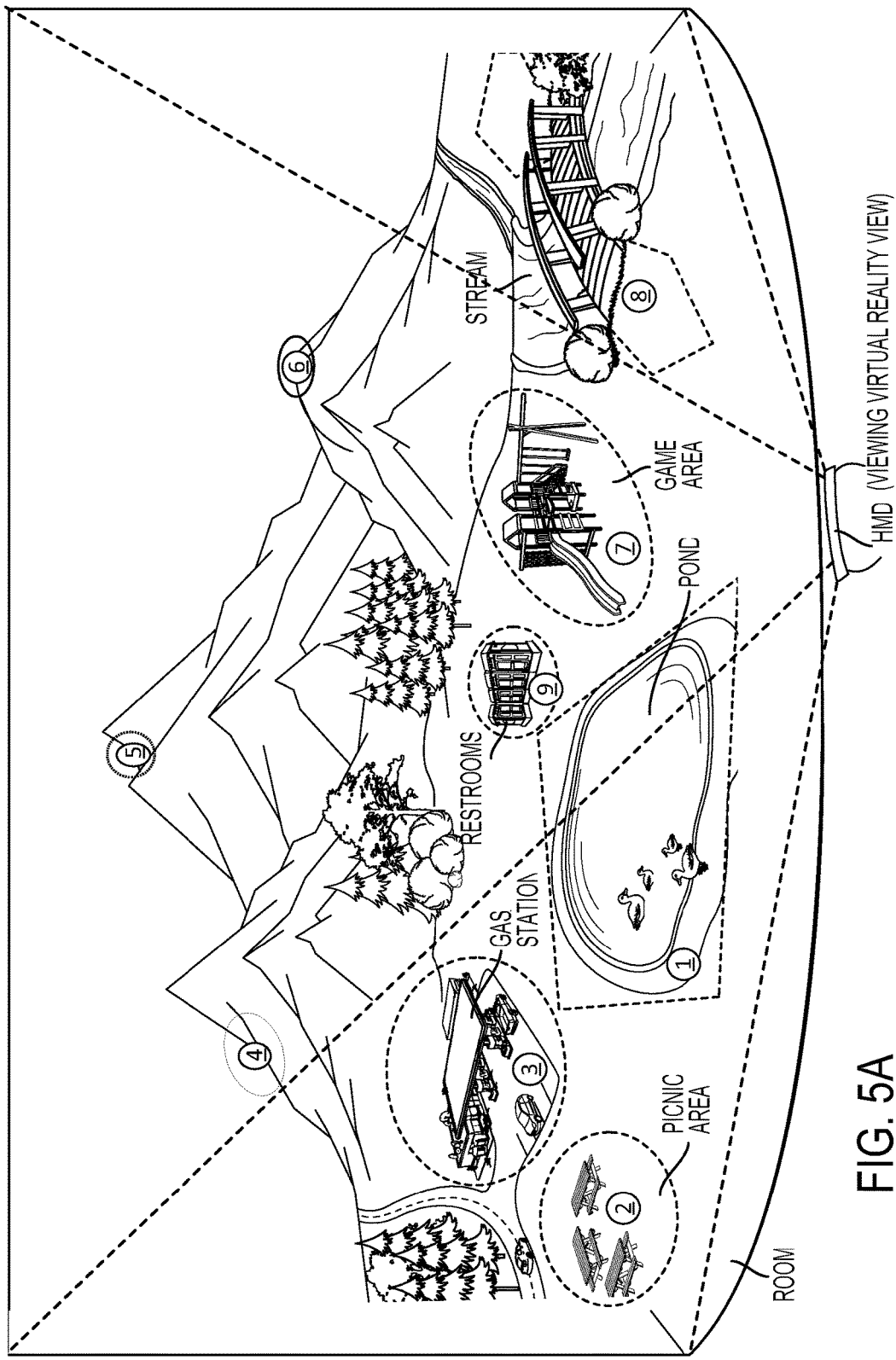
FIGS. 5A and 5B illustrate an image of a real-world environment that is being presented on a screen of the HMD and teleporting of a user to different locations within the real-world environment captured by the HMD, based on detected gaze direction of a user, in some embodiment of the invention.
Figure 5B:
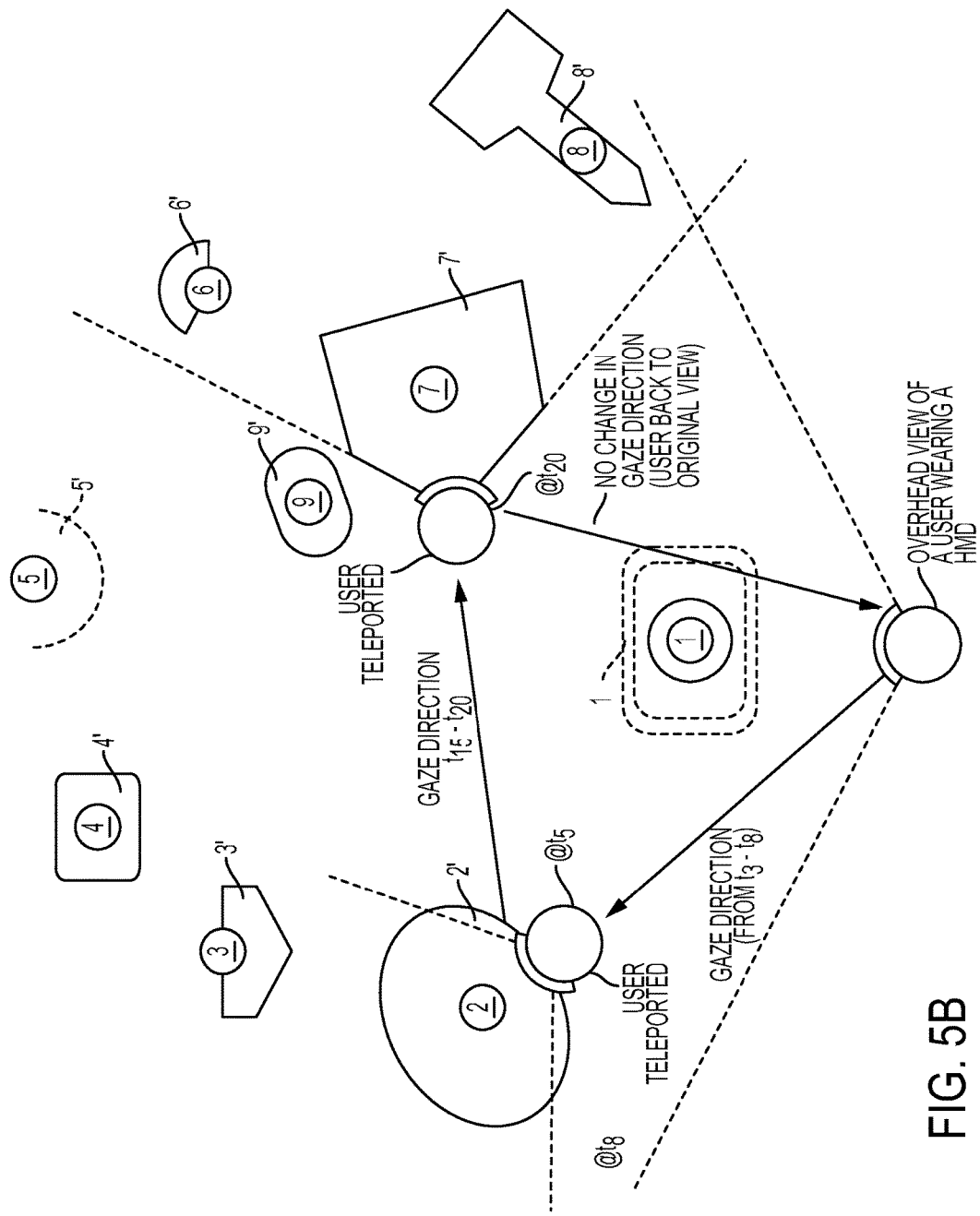

FIGS. 5A and 5B identify one such example of a VR scene that identifies various vista points or objects/points of interest identified by other users or by a computer to which a user may be teleported, in one embodiment. FIG. 5A illustrates a scene of a rest stop along a scenic route that is rendered on the display screen of the HMD of the user with different objects or points of interest at the rest stop identified by either other users or by a computer by analyzing the images of the scene, in one embodiment. In this embodiment, the scene is a pre-recorded real-world scene that was captured by a user or by a system and made available to other users. In some embodiments, the scene may be a virtual scene provided by an interactive application, such as a game application, for example. In some embodiments, the identified objects or points of interest are associated with tags, or are identified using visual or aural cues. For example, some of the points of interest identified in the scene of a rest stop along a scenic drive may include a duck pond, a picnic area, a gas station, one or more vista points on a mountain trail, play area, an over-bridge over a stream, and rest rooms. Each of these points of interest may be identified using highlights, a beacon, an outline, an arrow, flashing lights, etc., or by sound or other aural cues, when presented at the HMD. For simplicity sake, the points of interest are identified in FIG. 5A using reference numerals 1-9. In some embodiments, the objects or points of interest in the scene (either VR or real-world scene) are automatically identified (e.g., visually or aurally) during rendition of the VR scene at the HMD. In other embodiments, user interaction at the HMD may be required during the rendition of the VR scene to cause the objects or points of interest in the VR scene to be identified visually or aurally. For example, a button press may be required on the HMD in order for the points of interest associated with the current VR scene to be highlighted. The scene rendered on the HMD may also identify pre-defined virtual areas at or near different points of interest identified in the scene. In the scene illustrated in FIG. 5A, the user wearing the HMD is viewing the VR scene from a pre-defined virtual area near point 1 that is identified near the pond where ducks are present.

FIG. 5B illustrates other predefined virtual areas that are identified around or near the points or objects of interest, in one embodiment. The virtual areas may be identified based on the terrain and the nature or type of the object or point of interest that the virtual areas are associated with. In FIG. 5B, each of the points of interest (1-9) identified by reference numerals have a corresponding pre-defined virtual area (1'-9') associated with it. The pre-defined virtual area near the pond (represented by reference numeral 1) may be the pathway 1' surrounding the pond that is accessible to a user—meaning there are no barriers (such as trees, shrubs, structure, etc.) that can curb a user's movement in the virtual space. Similarly, the virtual area for the gas station (represented by reference numeral 3) may be identified to be an area (represented by reference numeral 3') that is in front of the gas station that includes the gas pumps and to the sides of the gas station. Further, the pre-defined virtual areas available near the various points of interest are mapped to the physical space in which the user operates, in some embodiments, so that any movement in the physical space can be correlated with the movement of the user in virtual space.

The movement of the user in the physical space may be correlated to user's actions in the VR scene, which acts to causes a change in the scene rendered on the HMD. For example, a user may initially (i.e., time $t_0$) start out viewing the VR scene that includes a rest stop along the scenic route illustrated in FIG. 5A, from a pre-defined area 1' defined near point 1. While viewing the VR scene, the user's gaze may be monitored. When the system detects that the user's gaze direction is directed toward point 2 from time $t_3$-$t_8$ (at least a pre-defined period of 4 seconds, for example), the user is "teleported" to the pre-defined area 2' that is defined around point 2 after the expiration of the pre-defined period of time (i.e., the user is teleported between time $t_7$ and $t_8$). The teleporting may be abrupt or may be done gradually, and the speed of teleporting is dependent on the user's preference, the type of content being rendered, etc. The teleporting causes the image rendered at the display screen of the HMD to be adjusted so as to change the view of the VR scene rendered at the HMD to a new view that is rendered from the perspective of the user at the new location defined by the pre-defined area 2'. As part of teleporting, certain portions of the VR scene around point 2 may appear larger or closer while others in the vicinity of point 2 are presented at a distance. The direction of the VR scene is based on the user's gaze direction and the VR scene is presented from the user's perspective. After teleporting the user to the new location 2', the system continues to monitor the user's actions, motions and gaze direction. When it is detected the user's gaze direction has shifted to point 7, the system determines if the user's gaze direction is on point 7 for at least the pre-defined period of time (e.g., of 4 seconds). When it is determined that the user's gaze has been on point 7 for at least the pre-defined period of time, the system teleports the user to the pre-defined area 7' associated with point 7 and renders images of the VR scene from the perspective of the user's new location. After teleporting the user to the new location (pre-defined area 7'), when it is determined that the user has not changed his gaze direction for a period of time, in one implementation, the user may be left at the new location till a change is detected. In an alternate implementation, the user may be returned to the original view by teleporting the user to the pre-defined area near point 1 after a period of time, and the user is presented with the VR scene from the pre-defined area near point 1.

Figure 6:
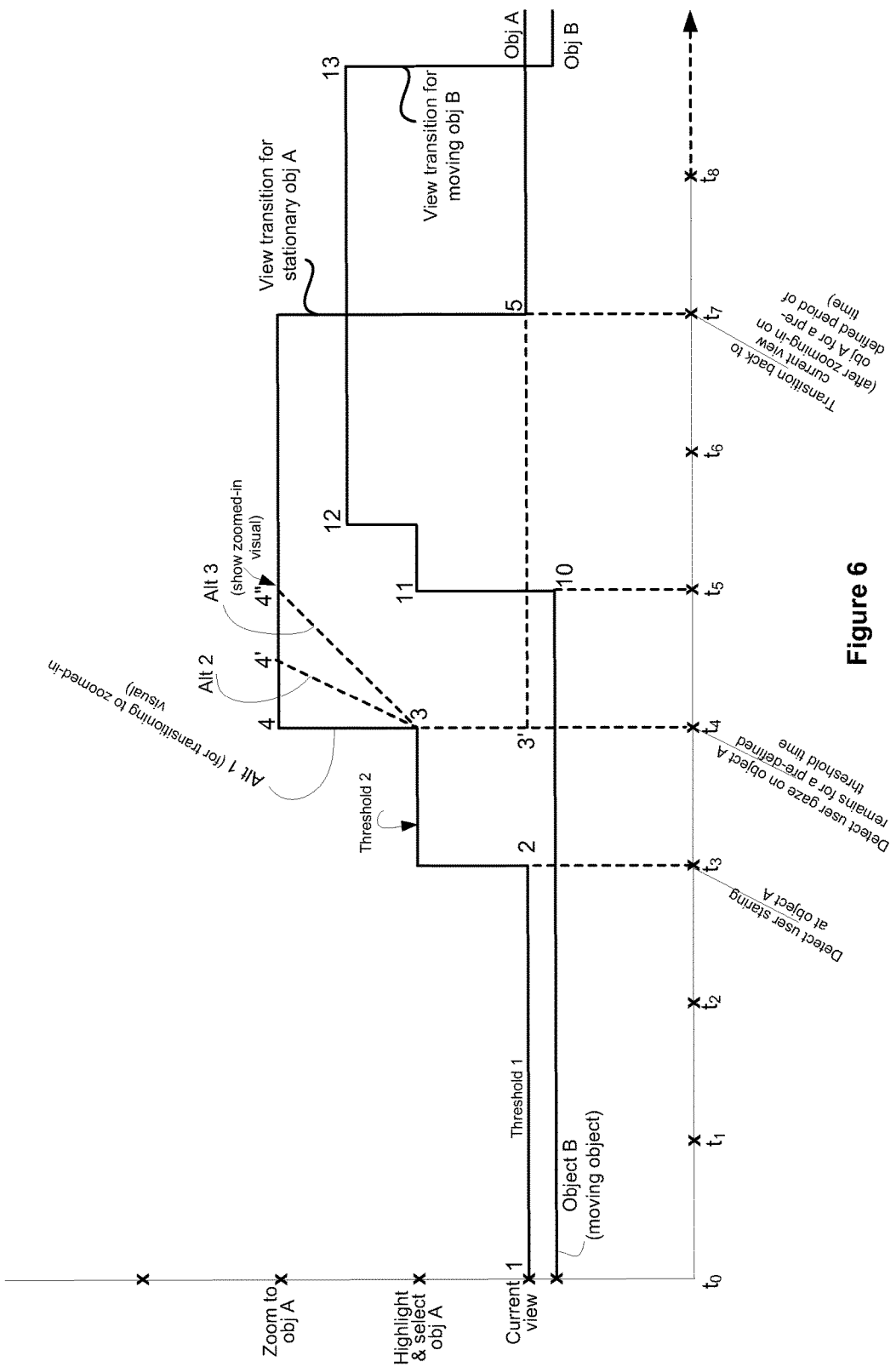
FIG. 6 illustrates a graphical representation of screen transition during presentation of an enhanced view of a real-world environment or virtual world scene, in some embodiments of the invention.

FIG. 6 illustrates a graphical representation identifying the transition points for adjusting the image rendered on the display screen of the HMD of the user, based on the gaze direction of the user, in one embodiment. At time $t_0$, a user may be currently viewing a VR scene that includes object A among other objects and points of interest (point 1 in the graph). At time $t_3$, the system may detect that users' gaze direction is focused on object A (point 2 in the graph) in the VR scene. The system continues to monitor the user's gaze direction and at time $t_4$, the system may determine that the user's gaze direction has remained on object A for the pre-defined period of time, and selects, highlights object A for a pre-defined period of time (point 3 in the graph). In some embodiment, as part of highlighting, the object of interest or the point of interest may be outlined to identify the object or point of interest that has caught the attention of the user.

In addition to outlining or highlighting the object or point of interest, a request may be generated by the system and presented to the user to obtain confirmation that the selected object or point of interest is indeed the object or point of interest that has grabbed the user's interest. The confirmation may be presented for a pre-defined period of time. A user, in response to the request, may provide confirmation through an action at the HMD (e.g., button press, swipe on a touch interface provided at the HMD, etc.), or using a controller (e.g., button press or swipe gesture using the controller or via audio command, etc.). The user action is associated with the object or point of interest by associating the user action to a tag of the object or point of interest. After expiration of the pre-defined period of time or after obtaining the confirmation from the user, if the user's gaze direction continues to remain on object A, the system generates a signal to adjust image of object A so that object A is zoomed in. The speed of adjusting the image of object A at the display screen may be driven by the type of content that is being rendered (e.g., high intensity video game scene, low intensity virtual tour, etc.), type, attributes of the object (stationary or moving) and by the user's comfort level. For example, if object A is a stationary object, such as a message board illustrated in FIGS. 4A-4C, and/or the user is able to handle a fast zoom in (based on user's reaction to various content (including moving object) rendered on the HMD), then the object A may be zoomed in fast, as illustrated by point 4 in the graph. If, however, the user prefers a slower adjustment, the object A may be zoomed in at a moderate speed, as illustrated by point 4' or at slower speed, as illustrated by point 4".

In some embodiments, the view presented by the HMD is adjusted so that the image from the VR scene is rendered in the background and the image of the zoomed-in object provided as an overlay on top of the VR scene. In some embodiments, the VR scene with the zoomed in object A is rendered for a period of time (e.g., 3 seconds, 4 seconds, etc.) and the display screen of the HMD is reverted back to view the images from the VR scene that was being shown to the user prior to the zooming in of object A, as illustrated by point 5. If, on the other hand, while object A is being highlighted for a period of time that is less than the pre-defined period of time, the user's gaze direction has shifted from object A, the system may retain the current view of the VR scene, as illustrated by point 3' on the dotted line of object A.

The various embodiments that have been described in detail with regards to the image of the VR scene or the real-world environment being rendered on a display screen of the HMD with the image of the object being zoomed in may also be extended to embodiments where the image of the VR scene or the real-world environment are projected by the HMD onto a display surface that is outside of the HMD. In this case, the image of the object that is zoomed in is also presented on the display surface on which the image of the VR scene or the real-world environment is being projected by the HMD. In alternate embodiments, when the object is zoomed-in, the zoomed-in object may be presented on the display screen of the HMD while the VR scene is projected on to the display surface or vice versa.

In another embodiment, the object that has caught the user's attention (based on the user's gaze direction) may be a moving object, object B. In such embodiment, the adjustment to the moving object B may be performed in a manner that takes into account the speed at which the object B is moving. As shown in FIG. 6, when it is detected that the user's gaze direction is on moving object B (at point 10), object B is selected and highlighted, as illustrated by point 11. The user's gaze direction continues to be monitored and the object B is zoomed in, as illustrated by point 12, when it is determined the user's gaze direction continues to remain on object B for at least the pre-defined period of time. The speed of zooming in on object B may take into account the speed at which the object B is moving so as to provide an enhanced image of object B, without causing the user any discomfort while continuing to present object B with sufficient clarity and focus. In some embodiments, the viewing width associated with the display screen of the HMD may be dynamically adjusted based on the speed of movement of the object and/or the head of the user wearing the HMD, when rendering the enhanced image of object B for the user. The dynamic adjustment of the viewing width of the display screen is to adjust field of view presented to the user so as to reduce motion sickness and/or assist in acclimatizing the user. The adjusted object B is rendered for a period of time, as illustrated by point 13, before resuming a current view of the VR scene in which object B is present.

In some embodiments, the speed at which an object is zoomed in, the amount of zooming, etc., may take into account the vision characteristics of the user's eyes wearing the HMD. Vision characteristics vary from one user to another and identify optical factors that are used to detect anomalies in the user's eyes affecting the clarity of vision of the user. In some cases, the vision characteristics are used to determine commonly occurring refractive errors of the eyes that can be corrected using corrective glasses or lenses. Details of these vision characteristics associated with a user can be taken into consideration when determining the speed or amount of zooming in of the object.

In some embodiments, the signal to adjust the image of the object may include a signal to adjust focal length of the lens of the forward facing camera, when capturing the images of the object from a real-world environment, or a signal to adjust an aperture setting of the lens so as to cause an adjustment to a depth of the object, or a signal to adjust brightness level of the object so that the user may be able to view the object clearly, etc. In some embodiments, the brightness level of the screen on which the image of the object is being rendered may also be adjusted (either by enhancing and diminishing the brightness level) to enable viewing of the object when rendered on the screen.

In some embodiments, the display screen of the HMD may be split into a first portion and a second portion. The object that has caught the interest of the user may be rendered in the first portion and the remaining content (real-world environment or VR scene) may be rendered in the second portion. The display screen may be split horizontally, vertically, diagonally, radially, etc, or in any other direction to allow the object or point of interest adjusted by a zoom factor to be rendered while at the same time allowing the user to view the VR scene without interruption. For example, the screen may be split in accordance to the direction in which an object that has caused the user's attention is moving (e.g., a thrown or bouncing ball, etc.).

In some embodiments, the view of the images of the real-world environment/VR scene and the object provided by the HMD may be split, in response to the signal, so that the images of the real-world environment or the VR scene is rendered on a first screen and the image of the object is rendered on a second screen. For example, the VR scene may be projected onto a display surface (i.e., first screen) that is external to the HMD using a projector mechanism that is available within the HMD while the enhanced image of the object is rendered on a display screen of the HMD (i.e., second screen). In some embodiments, the projector mechanism may be external to the HMD but may be controlled using input provided at the HMD or the controller that is communicatively coupled to the HMD. In another example, the display surface external to the HMD may be used to project the enhanced image of the object while the image from the VR scene is rendered on the display screen of the HMD.

In some embodiments, user movement in the physical space is used to adjust the image in the VR scene rendered on the HMD. The user's movement in the physical space may be controlled by the amount of space available in pre-defined area(s) in the VR scene. In some embodiments, the VR scene presented at the HMD would identify the user's relative location based on the detected movement and adjusts the image in the VR scene to correlate with the detected movement. To assist the user in determining the available space in the physical world, the system may provide outline of objects in the physical world as an overlay on the VR scene with the user's initial position in the VR scene highlighted or presented as a crosshair identifier or using other identification techniques. As the user moves around, the user's movements are reflected in the pre-defined virtual area near the object(s) within the VR scene. When the user moves closer to a boundary of the pre-defined virtual area, the user is provided with visual or aural warning. In some embodiments, the visual warning for a scene of a cliff of a mountain to indicate to the user that he is moving closer to the boundary. Similarly, the user's movement in the physical world may be mapped to space available for user's movement in the physical world. The space available in the physical world may be bound by physical objects, other users, etc. As the user approaches any of the physical objects or other users, the image in the VR scene may be adjusted to provide a warning to the user. In some embodiment, the warning may be presented as a visual line identifying the boundary of movement for the user and the user's proximity to the boundary. In some embodiments, the intensity of the visual line may be increased as the user approaches the boundary. In some embodiments, instead of or in addition to the visual cue, the user may be presented with haptic or aural warning with the intensity of such warnings increasing as the user approaches closer to a physical object or the boundary defined in the VR scene. For more information on providing warnings to users based on safety conditions, reference can be made to application Ser. No. 14/254,881, filed on Apr. 16, 2014, and entitled, "Systems and Methods for Transitioning Between Transparent Mode and Non-Transparent Mode in a Head Mounted Display," which is incorporated herein by reference in its entirety.

The various embodiments discussed herein allow the HMD to act as a virtual binocular allowing the images to be adjusted based on the gaze direction of the user. The images are adjusted in a manner that makes it appear that the user is being teleported to a new location that is closer to an object of interest to the user. The images are presented in a manner that makes it discernible to the user.

Figure 7:
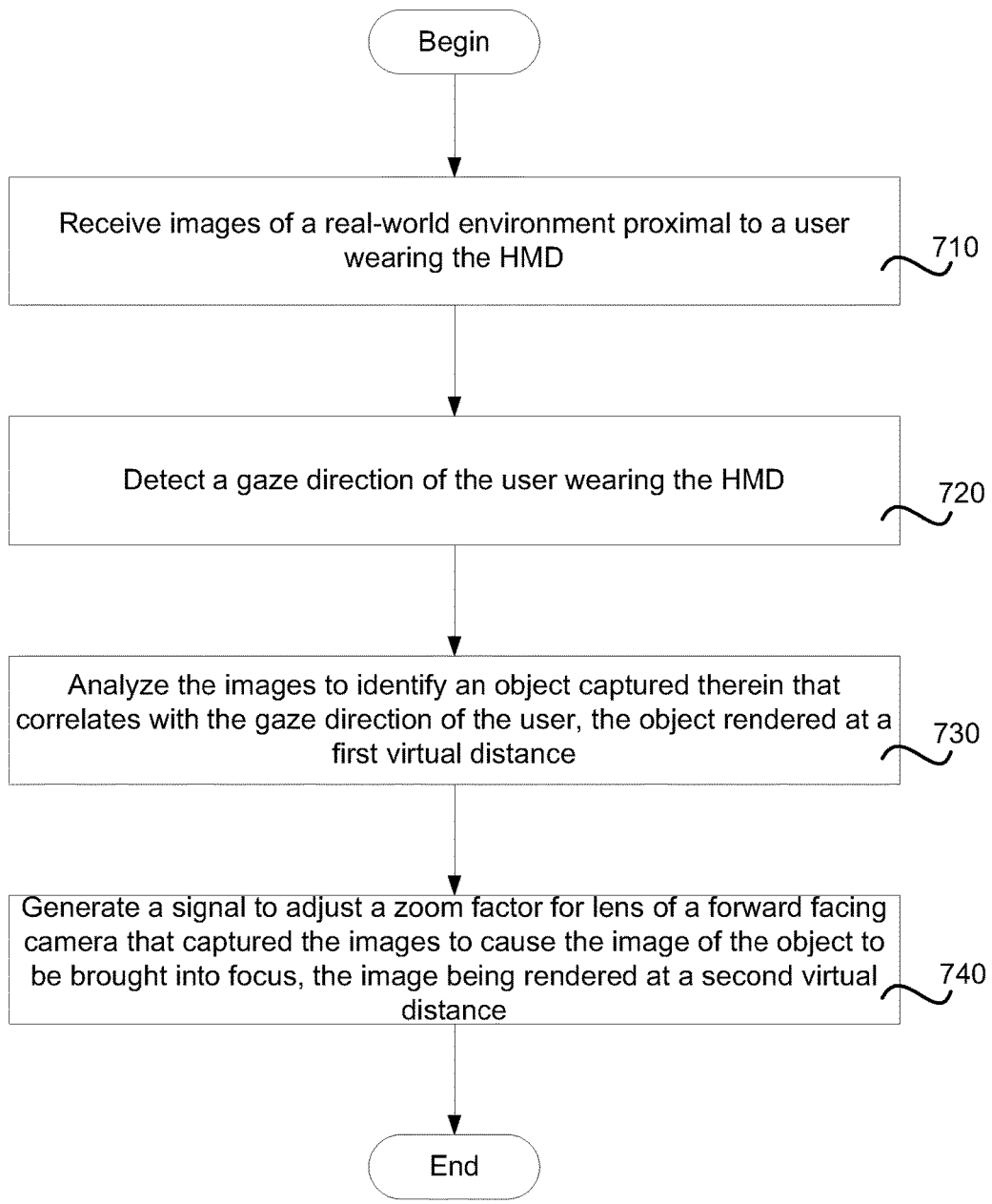
FIG. 7 illustrates operation flow of a method that is used for providing image of an object in a real-world environment or from a virtual scene, in accordance to an embodiment of the invention.

FIG. 7 illustrates method operations for presenting an object of interest from a real-world environment on a screen of a head mounted display (HMD), in accordance to an embodiment of the invention. The method begins at operation 710, wherein an image of a real-world environment proximal to a user wearing the HMD is received at the HMD. The image is received from one or more forward facing cameras disposed on the face of the HMD, for example. The image is processed by a processor of the HMD to determine the various objects and the scene captured in the image.

The HMD then determines a gaze direction of the user wearing the HMD, as illustrated in operation 720. The gaze direction is determined by tracking the user's gaze using one or more cameras, such as gaze detection cameras or other inward facing image capturing devices, that are provided on the inside surface of the HMD and directed toward one or more both eyes of the user. The gaze direction may be identified by a set of coordinates. The captured image is forwarded by the camera(s) to the processor of the HMD for analysis.

The HMD processor analyzes the image received from the camera and determines an object or point in the real-world environment that has captured the user's interest, as illustrated in operation 730. The object or point of interest is determined by matching the set of coordinates identified from the gaze direction with a specific area of the display screen and identifying the object or point rendered in that specific area. This is one way of identifying the object or point of interest and other ways of identifying the object or the point of interest may also be used. For example, the image of the real-world environment may be analyzed to obtain the coordinates of various points, objects found in the environment and mapping the coordinates of the gaze direction to the corresponding points, objects in the environment. The mapping may be performed using a two-dimensional or a three-dimensional representation of the image of the real-world environment. The image analysis also determines the virtual distance at which the object or point of interest is being rendered.

The processor of the HMD then generates a signal to adjust a zoom factor for lens of the one or more forward facing cameras that was engaged to capture the image of the real-world environment, such that the image of the object or point of interest is zoomed in and brought into focus, as illustrated in operation 740. The zooming in causes the image of the object to be rendered at a second virtual distance which appears closer for the user than the original image. Further, the zooming in is done in such a manner that the image of the object is brought into focus while keeping the image sharp and clear.

Figure 8:
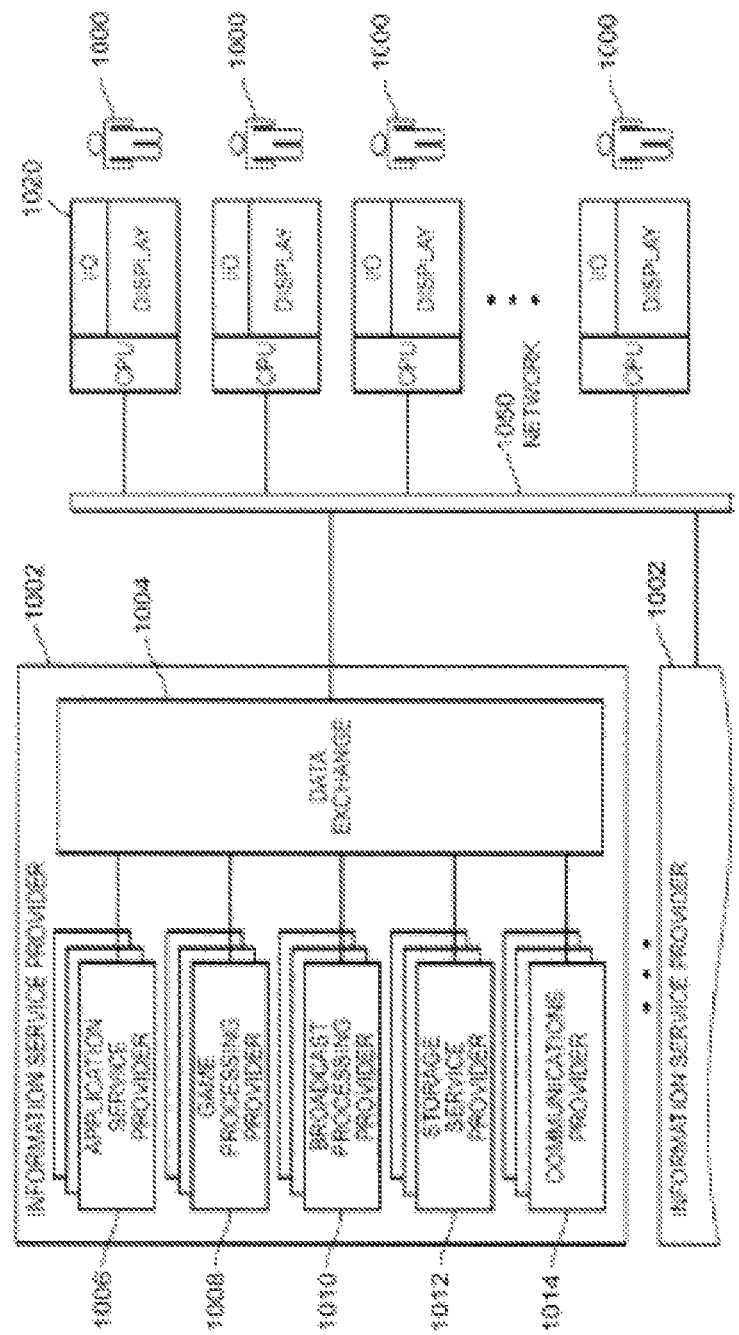
FIG. 8 illustrates example Information Service Provider architecture for delivering informational content and services to users who are geographically dispersed and connected via network, in accordance with one embodiment of the present invention.

FIG. 8 illustrates an embodiment of an Information Service Provider architecture that may be used in providing access to different games. Information Service Providers (ISP) 1070 deliver a multitude of information services to users 1082 geographically dispersed and connected via network 1050. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GaPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as HTML, to access ISP 1070.

Figure 9:
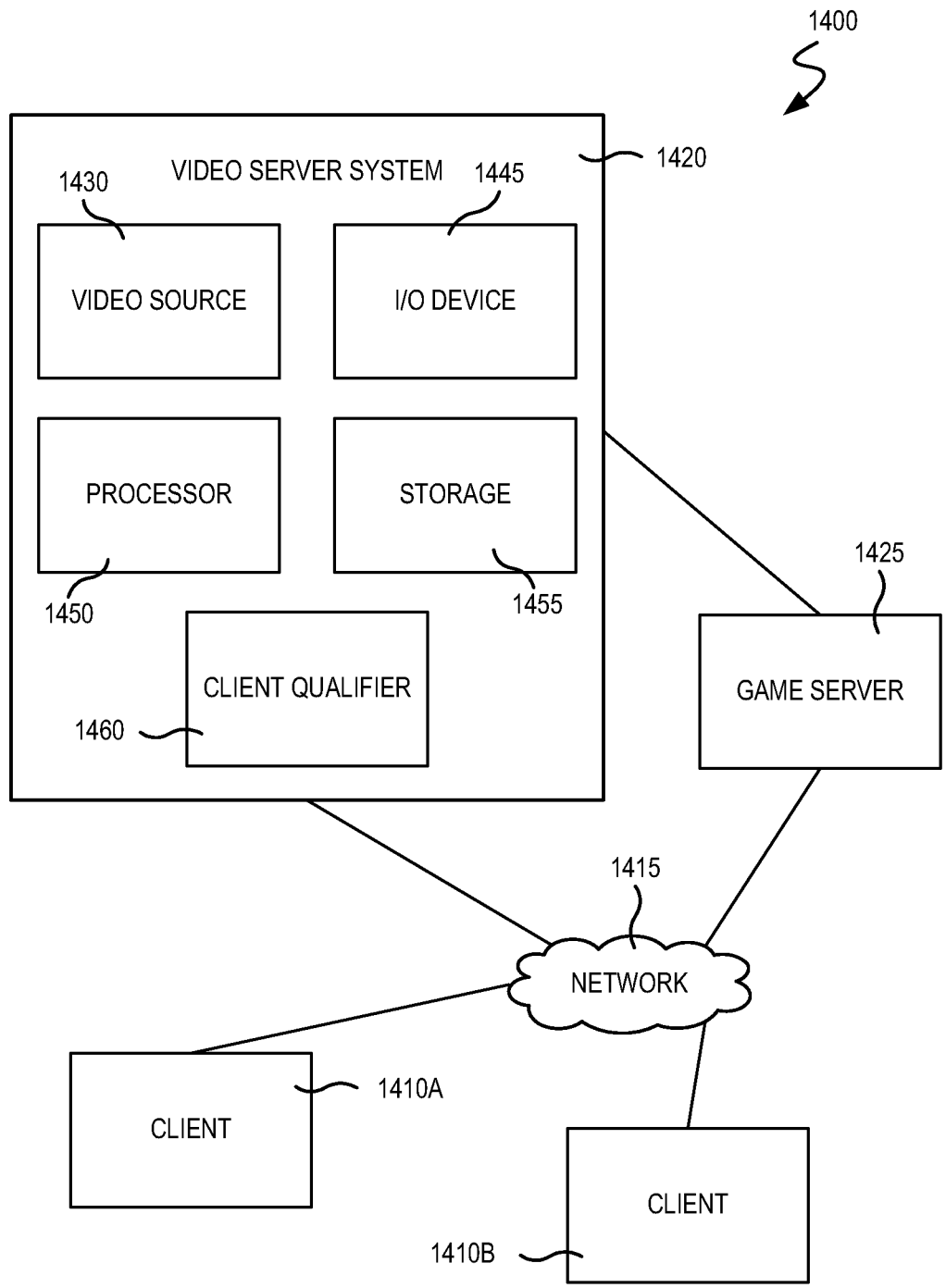
FIG. 9 illustrates a simplified block diagram of an example Game System, in accordance with various embodiments of the invention.

FIG. 9 is a block diagram of a Game System 1400, according to various embodiments of the invention. Game System 1400 is configured to provide a video stream to one or more Clients 1410 via a Network 1415. The Network is similar to the Network 200 illustrated in FIG. 1. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change instantly with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

With the above embodiments in mind, it should be understood that the invention may employ various computer-implemented operations involving data stored in computer systems. These operations include operations requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. Alternately, the computer readable code may be downloaded from a server using the data exchange interconnects described above. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting an object from a real-world environment on a screen of a head mounted display (HMD), comprising:

receiving images of the real-world environment proximal to a user wearing the HMD, the images received from one or more forward facing cameras of the HMD and processed by a processor of the HMD for rendering on the screen;

detecting a gaze direction of the user wearing the HMD, using one or more gaze detecting cameras of the HMD that are directed toward one or each eye of the user;

analyzing the images to identify an object captured in the images of the real-world environment that correlates with the gaze direction of the user, wherein an image of the object is rendered at a first virtual distance that causes the object to appear out-of-focus for the user; and generating a signal to adjust a zoom factor for lens of the one or more forward facing cameras so as to cause the image of the object to be brought into focus, wherein adjusting the zoom factor results in the image of the object to be presented on the screen of the HMD at a second virtual distance, wherein the signal is generated upon determining the gaze direction of the user directed toward the object lasts at least a pre-defined length of time, and wherein the zoom factor is adjusted to cause the object to be rendered at the second virtual distance for a pre-defined period and upon expiration of the pre-defined period resuming rendering images from the real-world environment without the zoom factor.

2. The method of claim 1, wherein the zoom factor is adjusted to account for vision characteristics of the user wearing the HMD so that the image of the object is discernible to the user when rendered at the second virtual distance.

3. The method of claim 1, wherein the signal to adjust the zoom factor includes a signal to adjust an aperture setting of lens in the one or more forward facing cameras so as to cause an adjustment to a depth at which the image of the object is captured by the one or more forward facing cameras of the HMD.

4. The method of claim 1, wherein the signal to adjust the zoom factor includes a signal to adjust a focal length of lens of the one or more forward facing cameras when capturing the images of the object in the real-world environment, the adjustment to the focal length of the lens causes zooming in of the object.

5. The method of claim 1, wherein the signal to adjust the zoom factor further includes a signal to control a speed of zooming, wherein the speed of zooming is controlled based on type of the images of the real-world environment captured, attributes of the object, or based on the user.

6. The method of claim 1, wherein the signal further includes a signal to adjust brightness level of the image of the object when rendered on the screen.

7. The method of claim 1, further includes constructing a three-dimensional digital model of the real-world environment using the images captured by the forward facing cameras of the HMD, the three-dimensional digital model constructed by tracking different points captured in multiple frames of the images and correlating the different points to a three dimensional space.

8. The method of claim 1, wherein identifying the object further includes, outlining the object captured in the images that correspond with the gaze direction; and receiving confirmation on identification of the object from the user wearing the HMD.

9. The method of claim 8, wherein the confirmation is obtained through any one of a button press on the HMD, button press on a controller communicatively connected to the HMD, selection of an option provided in a user interface rendered on the screen of the HMD, an audio command, gesture confirmation, or two or more combinations thereof.

10. The method of claim 8, wherein the confirmation of the object is based on a tag associated with the object.

11. The method of claim 1, further includes splitting a view presented on the screen of the HMD into a first portion and a second portion, the image of the object adjusted to zoom factor presented in the first portion and the image of the real-world environment rendered in the second portion.

12. The method of claim 1, wherein the second virtual distance is shorter than the first virtual distance.

13. A method for presenting an object from a real-world environment rendered on a screen of a head mounted display (HMD), comprising:

receiving images of a real-world environment proximal to a user wearing the HMD, the images received from one or more forward facing cameras of the HMD and processed by a processor within the HMD for rendering on the screen of the HMD;

identifying an object captured in the images of the real-world environment that is rendered at a first virtual distance, wherein the first virtual distance makes the object appear out-of-focus for the user; and generating a signal to adjust a zoom factor for lens of the one or more forward facing cameras so as to cause an image of the object to be brought into focus for the user to view, the object being rendered at a second virtual distance, wherein the zoom factor is adjusted to cause the object to be rendered at the second virtual distance for a pre-defined period of time and upon expiration of the pre-defined period resuming rendering the images of the real-world environment without the zoom factor.

14. The method of claim 13, wherein the object is identified based on a visual or aural notification provided at the HMD, a visual cue provided on the screen of the HMD, or occurrence of a pre-defined event.

\* \* \* \* \*